US012143993B2

(12) United States Patent
Fong et al.

(10) Patent No.: US 12,143,993 B2
(45) Date of Patent: Nov. 12, 2024

(54) SCHEDULING REQUEST POLLING FOR SIDELINK COMMUNICATIONS

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Xiaojie Wang, Hillsborough, NJ (US); Junyi Li, Fairless Hills, PA (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/347,014

(22) Filed: Jun. 14, 2021

(65) Prior Publication Data
US 2022/0022227 A1    Jan. 20, 2022

Related U.S. Application Data

(60) Provisional application No. 63/053,415, filed on Jul. 17, 2020.

(51) Int. Cl.
*H04W 74/06* (2009.01)
*H04W 72/20* (2023.01)

(52) U.S. Cl.
CPC .......... *H04W 72/20* (2023.01); *H04W 74/06* (2013.01)

(58) Field of Classification Search
CPC ....... H04W 72/20; H04W 72/23; H04W 4/06; H04W 4/46; H04W 4/44; H04W 74/06
See application file for complete search history.

(56) References Cited

U.S. PATENT DOCUMENTS

2015/0003440 A1*  1/2015  Lim .................. H04W 76/14
                                                           370/346
2016/0242221 A1   8/2016  Jung et al.
(Continued)

FOREIGN PATENT DOCUMENTS

EP          3614724 A1    2/2020
WO    WO-2020146461 A1   7/2020

OTHER PUBLICATIONS

Interdigitainterdigital Inc: "Mode 2a and Mode 2d for NR V2X Resource Allocation", 3GPP Draft, 3GPP RAN WG1 Meeting AH 1901, R1-1900769, (R16 V2X WI AI72414 Resource Allocation), 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593615, 16 Pages, Retrieved from the Internet: URL: http://www.3gpp.org/ftp/Meetings%5F3GPP%5FSYNC/RAN1/Docs/R1%2D1900769%2Ezip [retrieved on Jan. 20, 2019] pp. 1-8 pp. 11-13, 6.2 Detailed Procedure for Mode 2a using LBT Scheme, section "3 Resource allocation Mode 2d".

(Continued)

*Primary Examiner* — Anez C Ebrahim
(74) *Attorney, Agent, or Firm* — Holland & Hart LLP

(57)    ABSTRACT

Methods, systems, and devices for wireless communications are described. A transmitting device may transmit a polling request to a receiving device in sidelink control information that is associated with a sidelink data transmission. The polling request may be included in a sidelink control information message or in a medium access control layer message. The receiving device may respond to the polling request with an indication of whether there is data available for transmission to the transmitting device at the receiving device. The transmitting device may determine whether to (Continued)

schedule reverse sidelink resources for the receiving device to transmit the available data based on the response to the polling request.

26 Claims, 11 Drawing Sheets

(56) References Cited

U.S. PATENT DOCUMENTS

| | | | |
|---|---|---|---|
| 2019/0380142 A1 | 12/2019 | Wang et al. | |
| 2022/0078753 A1* | 3/2022 | Park | H04W 28/02 |
| 2022/0104088 A1* | 3/2022 | Byun | H04W 36/023 |
| 2022/0369187 A1 | 11/2022 | Ganesan et al. | |
| 2022/0377649 A1 | 11/2022 | Choi et al. | |
| 2022/0399927 A1* | 12/2022 | Tsai | H04B 7/0617 |
| 2023/0022915 A1 | 1/2023 | Bhamri et al. | |
| 2023/0246742 A1* | 8/2023 | Yoshioka | H04L 1/1854 370/329 |

OTHER PUBLICATIONS

International Search Report and Written Opinion—PCT/US2021/037498—ISA/EPO—Sep. 29, 2021.
OPPO: "Discussion on Mode 2 Resource Allocation in NR-V2X", 3GPP Draft, 3GPP TSG-RAN WG1 AH Meeting #1901, R1-1900289, Mode 2 Ra, 3rd Generation Partnership Project (3GPP), Mobile Competence Centre, 650, Route Des Lucioles, F-06921, Sophia-Antipolis Cedex, France, vol. RAN WG1, No. Taipei, Jan. 12, 2019-Jan. 25, 2019, Jan. 20, 2019 (Jan. 20, 2019), XP051593203, 11 pages, Retrieved from the Internet: URL: http://www.3gpp.org/ftp/Meetings%5F3GPP%5FSYNC/RAN1/Docs/R1%2D1900289%2Ezip [retrieved on Jan. 20, 2019] section "2.2 Sub-mode 2(d)".

* cited by examiner

SCHEDULING REQUEST POLLING FOR SIDELINK COMMUNICATIONS

CROSS REFERENCE

The present Application for Patent claims the benefit of U.S. Provisional Patent Application No. 63/053,415 by Fong et al., entitled "SCHEDULING REQUEST POLLING FOR SIDELINK COMMUNICATIONS," filed Jul. 17, 2020, assigned to the assignee hereof, and expressly incorporated by reference herein.

FIELD OF TECHNOLOGY

The following relates generally to wireless communications and more specifically to scheduling request polling for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support direct communications between UEs that may be performed without being explicitly scheduled by a base station. Such communications may be referred to as sidelink communications. In some examples, the sidelink communications are performed using sidelink resources that have been reserved by the base station for sidelink communications.

SUMMARY

The described techniques relate to improved methods, systems, devices, and apparatuses that support scheduling request polling for sidelink communications. A transmitting device may transmit a polling request to a receiving device in sidelink control information that is associated with a sidelink data transmission. The polling request may be included in a sidelink control information message or in a medium access control (MAC) layer control message. The receiving device may respond to the polling request with an indication of whether there is data available for transmission to the transmitting device at the receiving device. The transmitting device may determine whether to schedule reverse sidelink resources for the receiving device to transmit the available data based on the response to the polling request.

A method for wireless communication at a first wireless device is described. The method may include receiving an indication of sidelink communication resources that are reserved for sidelink transmissions, transmitting a polling request in control information that is associated with a data transmission from the first wireless device using the sidelink communication resources, and receiving, from a second wireless device in response to the polling request, feedback including an indication of an availability of data for transmission to the first wireless device.

An apparatus for wireless communication at a first wireless device is described. The apparatus may include a processor, memory in electronic communication with the processor, and instructions stored in the memory. The instructions may be executable by the processor to cause the apparatus to receive an indication of sidelink communication resources that are reserved for sidelink transmissions, transmit a polling request in control information that is associated with a data transmission from the first wireless device using the sidelink communication resources, and receive, from a second wireless device in response to the polling request, feedback including an indication of an availability of data for transmission to the first wireless device.

Another apparatus for wireless communication at a first wireless device is described. The apparatus may include means for receiving an indication of sidelink communication resources that are reserved for sidelink transmissions, means for transmitting a polling request in control information that is associated with a data transmission from the first wireless device using the sidelink communication resources, and means for receiving, from a second wireless device in response to the polling request, feedback including an indication of an availability of data for transmission to the first wireless device.

A non-transitory computer-readable medium storing code for wireless communication at a first wireless device is described. The code may include instructions executable by a processor to receive an indication of sidelink communication resources that are reserved for sidelink transmissions, transmit a polling request in control information that is associated with a data transmission from the first wireless device using the sidelink communication resources, and receive, from a second wireless device in response to the polling request, feedback including an indication of an availability of data for transmission to the first wireless device.

In some examples of the method, apparatuses, and non-transitory computer-readable medium described herein, transmitting the polling request in sidelink control information using sidelink control channel resources of the sidelink communication resources, sidelink data channel resources of the sidelink communication resources, or a combination thereof may include operations, features, means, or instructions for transmitting the polling request in sidelink control information using sidelink control channel resources of the sidelink communication resources, sidelink data channel resources of the sidelink communication resources, or a combination thereof.

In some examples of the method, apparatuses, and non-transitory computer-readable medium described herein, transmitting the polling request in first sidelink control information includes transmitting the polling request in first sidelink control information or second sidelink control information, wherein the first sidelink control information uses the sidelink control channel resources in accordance with a first sidelink control information format and is used to schedule the second sidelink control information and data transmission over the sidelink data channel resources.

In some examples of the method, apparatuses, and non-transitory computer-readable medium described herein, a field in the first sidelink control information that may be configured to indicate the second sidelink control information format for the second sidelink control information includes the polling request.

In some examples of the method, apparatuses, and non-transitory computer-readable medium described herein, transmitting the polling request in first sidelink control information that may be transmitted during an occurrence of the sidelink data channel resources in accordance with a first sidelink control information format and may be used to indicate characteristics of the data transmission may include operations, features, means, or instructions for transmitting the polling request in first sidelink control information that may be transmitted during an occurrence of the sidelink data channel resources in accordance with a first sidelink control information format and may be used to indicate characteristics of the data transmission.

In some examples of the method, apparatuses, and non-transitory computer-readable medium described herein, a first field in the second sidelink control information used to request channel state information from the second wireless device includes the polling request; or a second field in the second sidelink control information used to indicate polling requests includes the polling request.

In some examples of the method, apparatuses, and non-transitory computer-readable medium described herein, a field in the first sidelink control information may be used to indicate that the polling request may be for a group of wireless devices of a set of groups of wireless devices.

Some examples of the method, apparatuses, and non-transitory computer-readable medium described herein may further include operations, features, means, or instructions for transmitting, to the second wireless device, an indication that the second wireless device may be included in the group of wireless devices.

Some examples of the method, apparatuses, and non-transitory computer-readable medium described herein may further include operations, features, means, or instructions for transmitting, to the group of wireless devices, a configuration that configures the group of wireless devices to monitor for polling requests during a set of time intervals that includes the time interval.

In some examples of the method, apparatuses, and non-transitory computer-readable medium described herein, receiving, from the second wireless device, a scheduling request using sidelink feedback channel resources of the sidelink communication may include operations, features, means, or instructions for receiving, from the second wireless device, a scheduling request using sidelink feedback channel resources of the sidelink communication resources.

Some examples of the method, apparatuses, and non-transitory computer-readable medium described herein may further include operations, features, means, or instructions for determining that the second wireless device may have data to transmit to the first wireless device based on the scheduling request.

Some examples of the method, apparatuses, and non-transitory computer-readable medium described herein may further include operations, features, means, or instructions for receiving a medium access control-control element including a buffer status report indicating an amount of data available for transmission from the second wireless device based on receiving the scheduling request and determining the amount of data available for transmission from the second wireless device based on the buffer status report.

In some examples of the method, apparatuses, and non-transitory computer-readable medium described herein, receiving, from the second wireless device, an indication of an amount of data available for transmission from the second wireless device using sidelink feedback channel may include operations, features, means, or instructions for receiving, from the second wireless device, an indication of an amount of data available for transmission from the second wireless device using sidelink feedback channel resources.

Some examples of the method, apparatuses, and non-transitory computer-readable medium described herein may further include operations, features, means, or instructions for determining the amount of data available for transmission from the second wireless device based on the indication.

In some examples of the method, apparatuses, and non-transitory computer-readable medium described herein, receiving the feedback for the polling request using sidelink feedback channel may include operations, features, means, or instructions for receiving the feedback for the polling request using sidelink feedback channel resources.

Some examples of the method, apparatuses, and non-transitory computer-readable medium described herein may further include operations, features, means, or instructions for receiving second feedback for a data message included in the data transmission, where the second feedback may be received using the sidelink feedback channel resources, the second feedback being multiplexed with the feedback.

Some examples of the method, apparatuses, and non-transitory computer-readable medium described herein may further include operations, features, means, or instructions for receiving second feedback for a data message included in the data transmission, where the second feedback may be received using second sidelink feedback channel resources that may be non-overlapping with the sidelink feedback channel resources.

Some examples of the method, apparatuses, and non-transitory computer-readable medium described herein may further include operations, features, means, or instructions for transmitting a data message in the data transmission, where the control information provides characteristics of the data message.

Some examples of the method, apparatuses, and non-transitory computer-readable medium described herein may further include operations, features, means, or instructions for determining that an amount of data available to be transmitted from the second wireless device may be below a threshold based on the feedback and refraining from scheduling reverse sidelink resources for the second wireless device based on the amount of data being below the threshold.

Some examples of the method, apparatuses, and non-transitory computer-readable medium described herein may further include operations, features, means, or instructions for determining that an amount of data available to be transmitted from the second wireless device may be above a threshold based on the feedback and scheduling reverse sidelink resources for the second wireless device based on the amount of data being above the threshold.

Some examples of the method, apparatuses, and non-transitory computer-readable medium described herein may further include operations, features, means, or instructions for transmitting, in the control information, an indication of an absence of data in the data transmission.

In some examples of the method, apparatuses, and non-transitory computer-readable medium described herein, one or more fields in the control information may be used to indicate the absence of data in the data transmission.

In some examples of the method, apparatuses, and non-transitory computer-readable medium described herein, each of a set of bits corresponding to the one or more fields may be set to a first value.

Some examples of the method, apparatuses, and non-transitory computer-readable medium described herein may further include operations, features, means, or instructions for identifying a polling event for the second wireless device prior to an occurrence of sidelink data channel resources of the sidelink communication resources and determining that the sidelink data channel resources may be insufficient for conveying the data transmission, where the indication of the absence of data may be included in the control information based on the sidelink data channel resources being insufficient for conveying the data transmission.

In some examples of the method, apparatuses, and non-transitory computer-readable medium described herein, transmitting a medium access control-control element that includes the polling request in the data transmission, the control information being medium access control layer control information may include operations, features, means, or instructions for transmitting a medium access control-control element that includes the polling request in the data transmission, the control information being medium access control layer control information.

In some examples of the method, apparatuses, and non-transitory computer-readable medium described herein, receiving, in response to the polling request, a buffer status report using sidelink feedback channel may include operations, features, means, or instructions for receiving, in response to the polling request, a buffer status report using sidelink feedback channel resources.

Some examples of the method, apparatuses, and non-transitory computer-readable medium described herein may further include operations, features, means, or instructions for receiving second feedback for a data message included in the data transmission, where the second feedback may be received using the sidelink feedback channel resources, the second feedback being multiplexed with the feedback.

Some examples of the method, apparatuses, and non-transitory computer-readable medium described herein may further include operations, features, means, or instructions for receiving second feedback for a data message included in the data transmission, where the second feedback may be received using second sidelink feedback channel resources that may be non-overlapping with the sidelink feedback channel resources.

Some examples of the method, apparatuses, and non-transitory computer-readable medium described herein may further include operations, features, means, or instructions for generating the medium access control-control element and encapsulating the medium access control-control element in a header of a data message included in the data transmission.

A method for wireless communication at a first wireless device is described. The method may include receiving a polling request in control information that is associated with a data transmission from the first wireless device using sidelink communication resources that are reserved for sidelink transmissions and transmitting, to a second wireless device in response to the polling request, feedback including an indication of an availability of data for transmission to the second wireless device.

An apparatus for wireless communication at a first wireless device is described. The apparatus may include a processor, memory in electronic communication with the processor, and instructions stored in the memory. The instructions may be executable by the processor to cause the apparatus to receive a polling request in control information that is associated with a data transmission from the first wireless device using sidelink communication resources that are reserved for sidelink transmissions and transmit, to a second wireless device in response to the polling request, feedback including an indication of an availability of data for transmission to the second wireless device.

Another apparatus for wireless communication at a first wireless device is described. The apparatus may include means for receiving a polling request in control information that is associated with a data transmission from the first wireless device using sidelink communication resources that are reserved for sidelink transmissions and means for transmitting, to a second wireless device in response to the polling request, feedback including an indication of an availability of data for transmission to the second wireless device.

A non-transitory computer-readable medium storing code for wireless communication at a first wireless device is described. The code may include instructions executable by a processor to receive a polling request in control information that is associated with a data transmission from the first wireless device using sidelink communication resources that are reserved for sidelink transmissions and transmit, to a second wireless device in response to the polling request, feedback including an indication of an availability of data for transmission to the second wireless device.

In some examples of the method, apparatuses, and non-transitory computer-readable medium described herein, receiving the polling request in sidelink control information using sidelink control channel resources of the sidelink communication resources, sidelink data channel resources of the sidelink communication resources, or a combination thereof may include operations, features, means, or instructions for receiving the polling request in sidelink control information using sidelink control channel resources of the sidelink communication resources, sidelink data channel resources of the sidelink communication resources, or a combination thereof.

In some examples of the method, apparatuses, and non-transitory computer-readable medium described herein, receiving the polling request may include receiving the polling request in first sidelink control information or second sidelink control information, wherein the first sidelink control information uses the sidelink control channel resources in accordance with a first sidelink control information format and is used to schedule the second sidelink control information and data transmission over the sidelink data channel resources.

In some examples of the method, apparatuses, and non-transitory computer-readable medium described herein, a field in the first sidelink control information that may be configured to indicate the second sidelink control information format for the second sidelink control information includes the polling request.

In some examples of the method, apparatuses, and non-transitory computer-readable medium described herein, receiving the polling request in first sidelink control information that may be transmitted during an occurrence of the sidelink data channel resources in accordance with a first sidelink control information format and may be used to indicate characteristics of the data transmission may include operations, features, means, or instructions for receiving the polling request in first sidelink control information that may be transmitted during an occurrence of the sidelink data channel resources in accordance with a first sidelink control information format and may be used to indicate characteristics of the data transmission.

In some examples of the method, apparatuses, and non-transitory computer-readable medium described herein, a first field in the second sidelink control information used to request channel state information from the first wireless device includes the polling request; or a second field in the second sidelink control information used to indicate polling requests includes the polling request.

In some examples of the method, apparatuses, and non-transitory computer-readable medium described herein, a field in the first sidelink control information may be used to indicate that the polling request may be for a group of wireless devices of a set of groups of wireless devices.

Some examples of the method, apparatuses, and non-transitory computer-readable medium described herein may further include operations, features, means, or instructions for receiving, from the second wireless device, an indication that the first wireless device may be included in the group of wireless devices.

Some examples of the method, apparatuses, and non-transitory computer-readable medium described herein may further include operations, features, means, or instructions for receiving a configuration that configures the first wireless device to monitor for polling requests during a set of time intervals that includes the time interval.

In some examples of the method, apparatuses, and non-transitory computer-readable medium described herein, transmitting, to the second wireless device, a scheduling request using sidelink feedback channel resources of the sidelink communication may include operations, features, means, or instructions for transmitting, to the second wireless device, a scheduling request using sidelink feedback channel resources of the sidelink communication resources.

Some examples of the method, apparatuses, and non-transitory computer-readable medium described herein may further include operations, features, means, or instructions for transmitting a medium access control-control element including a buffer status report indicating an amount of data available for transmission from the first wireless device based on receiving the scheduling request.

In some examples of the method, apparatuses, and non-transitory computer-readable medium described herein, transmitting, to the second wireless device, an indication of an amount of data available for transmission from the first wireless device using sidelink feedback channel may include operations, features, means, or instructions for transmitting, to the second wireless device, an indication of an amount of data available for transmission from the first wireless device using sidelink feedback channel resources.

In some examples of the method, apparatuses, and non-transitory computer-readable medium described herein, transmitting the feedback for the polling request using sidelink feedback channel may include operations, features, means, or instructions for transmitting the feedback for the polling request using sidelink feedback channel resources.

Some examples of the method, apparatuses, and non-transitory computer-readable medium described herein may further include operations, features, means, or instructions for transmitting second feedback for a data message included in the data transmission using the sidelink feedback channel resources, the second feedback being multiplexed with the feedback.

Some examples of the method, apparatuses, and non-transitory computer-readable medium described herein may further include operations, features, means, or instructions for transmitting second feedback for a data message included in the data transmission using second sidelink feedback channel resources that may be non-overlapping with the sidelink feedback channel resources.

Some examples of the method, apparatuses, and non-transitory computer-readable medium described herein may further include operations, features, means, or instructions for receiving, in the control information, an indication of an absence of data in the data transmission.

In some examples of the method, apparatuses, and non-transitory computer-readable medium described herein, one or more fields in the control information may be used to indicate the absence of data in the data transmission.

In some examples of the method, apparatuses, and non-transitory computer-readable medium described herein, each of a set of bits corresponding to the one or more fields may be set to a first value.

In some examples of the method, apparatuses, and non-transitory computer-readable medium described herein, receiving a medium access control-control element that includes the polling request in a header of the data transmission, the control information being medium access control layer control information may include operations, features, means, or instructions for receiving a medium access control-control element that includes the polling request in a header of the data transmission, the control information being medium access control layer control information.

In some examples of the method, apparatuses, and non-transitory computer-readable medium described herein, transmitting, in response to the polling request, a buffer status report using sidelink feedback channel may include operations, features, means, or instructions for transmitting, in response to the polling request, a buffer status report using sidelink feedback channel resources.

Some examples of the method, apparatuses, and non-transitory computer-readable medium described herein may further include operations, features, means, or instructions for transmitting second feedback for a data message included in the data transmission, where the second feedback may be received using the sidelink feedback channel resources, the second feedback being multiplexed with the feedback.

Some examples of the method, apparatuses, and non-transitory computer-readable medium described herein may further include operations, features, means, or instructions for transmitting second feedback for a data message included in the data transmission, where the second feedback may be received using second sidelink feedback channel resources that may be non-overlapping with the sidelink feedback channel resources.

DETAILED DESCRIPTION

A wireless communications system may be deployed in a factory environment and may include base stations and one or more wireless devices (e.g., programmable logic controllers (PLCs), sensors, actuators, and combined sensors and actuators). The term S/A may be used to broadly refer to sensors, actuators, and combined sensors/actuators. Wireless devices may communicate directly with one another over resources (which may be referred to as sidelink communication resources) that are reserved by a base station for direct communications between the wireless devices. In some examples, a transmitting device (e.g., a PLC) may be configured to schedule communications between the transmitting device and one or more receiving devices (e.g., one or more S/As) over the sidelink communication resources. Transmissions from the one or more receiving devices to the transmitting device may be referred to as reverse sidelink transmissions.

In some examples, reverse sidelink data resources may be scheduled for a receiving device (e.g., an S/A) to transmit data to a transmitting device (e.g., a PLC), but the receiving device may not have data to transmit to the transmitting device—e.g., a data buffer at the receiving device may be empty or an amount of data ready for transmission to the transmitting device may below a threshold. Thus, the reverse sidelink data resources may be unused by the receiving device, decreasing a throughput of reverse sidelink communications scheduled by the transmitting device.

To increase the throughput of reverse sidelink communications, a transmitting device may poll one or more receiving devices to determine whether the one or more receiving devices have data to transmit to the transmitting device. In some examples, a transmitting device may transmit a polling request to a receiving device in sidelink control information that is associated with a sidelink data transmission. The polling request may be included in a sidelink control information message or in a medium access control (MAC) layer control message. The receiving device may respond to the polling request with an indication of whether there is data available for transmission to the transmitting device at the receiving device. The transmitting device may determine whether to schedule reverse sidelink resources for the receiving device to transmit the available data based on the response to the polling request.

Aspects of the disclosure are initially described in the context of wireless communications systems. Aspects of the disclosure are further illustrated by and described with reference to a process flow diagram. Aspects of the disclosure are further illustrated by and described with reference to apparatus diagrams, system diagrams, and flowcharts that relate to scheduling request polling for sidelink communications.

Figure 1:
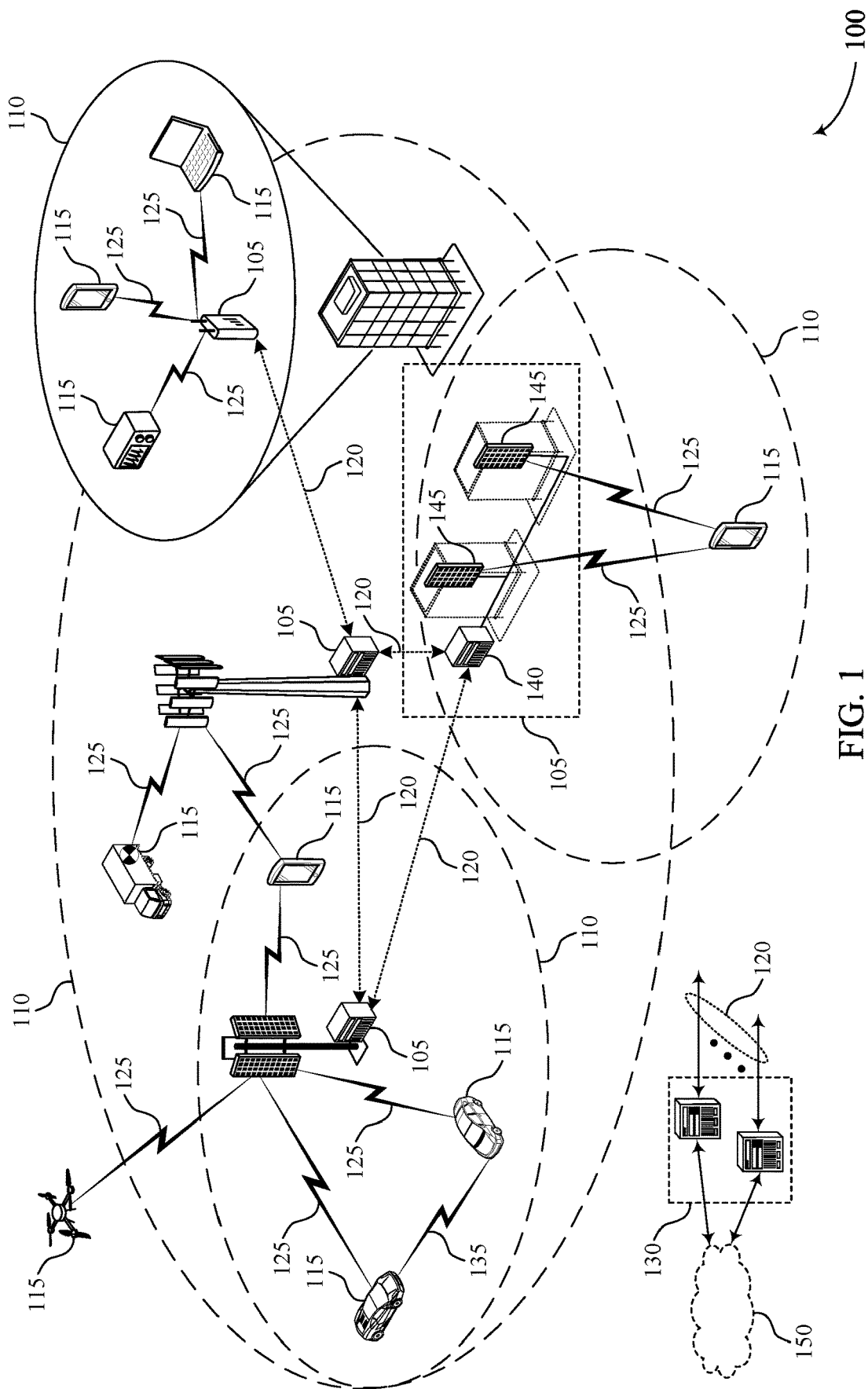
FIG. 1 illustrates an example of a system for wireless communications that supports scheduling request polling for sidelink communications in accordance with aspects of the present disclosure.

FIG. 1 illustrates an example of a wireless communications system 100 that supports scheduling request polling for sidelink communications in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless communications system may support communication protocols that enable UEs 115 to communicate directly with one another without being explicitly scheduled by a base station 105. In some examples, communications between UEs 115 may be referred to as D2D or sidelink communications. In some examples, a base station 105 schedules sidelink resources, and UEs 115 may communicate with one another over the scheduled sidelink resources. In some examples, the sidelink resources are contention-based resources and the UEs 115 may gain access to the sidelink resources using contention-based access techniques. In other examples, the base station 105 may schedule sidelink resources for sidelink communications between intended UEs 115.

A wireless communications system may be implemented in a factory environment. A wireless communications system in a factory environment may include S/As and PLCs that communicate with and make decisions based on data received from the S/As, and a central scheduling node (e.g., a base station 105). In some examples, PLCs, and S/As may be classified as UEs 115. In some examples, PLCs may also perform functions associated with a base station 105, such as scheduling sidelink resources for communications to and from S/As. In factory environments, wireless communications may use high-reliability and low-latency communication procedures (e.g., URLLC procedures). Also, communications in factory environments may be deterministic and periodic—that is, communications to and from S/As may occur at expected intervals.

In some examples, a PLC may communicate with S/As over sidelink resources that are scheduled by a base station 105 (e.g., using a downlink control message, such as a downlink control message configured in accordance with downlink control information (DCI) Format 3_0). The downlink control message may be used to allocate designated communication resources as physical sidelink control channel (PSCCH) resources and physical sidelink shared channel (PSSCH) resources, which may also be referred to as sidelink data resources. In some examples, the PLC may perform scheduling functions, allocating sidelink resources to S/As, transmitting sidelink control information (e.g., sidelink control information (SCI) 0-1, SCI 0-2, etc.) that indicates sidelink resources for an S/A, indicating reverse sidelink resources (such as physical sidelink feedback channel (PSFCH) resources), and the like. Sidelink resources used by a transmitting device (e.g., a PLC) to transmit data to a receiving device (e.g., an S/A) may be referred to as forward sidelink resources (or simply as sidelink resources). Sidelink resources used by the receiving device to transmit back (e.g., reverse data and/or feedback) to the transmitting device may be referred to as reverse sidelink resources.

Sidelink control information may be conveyed in one or more sidelink control information messages. For example, a first sidelink control information message may be conveyed in PSCCH resources in accordance with a first sidelink control information format (e.g., SCI 0-1), and a sidelink control information message may be conveyed in PSSCH resources in accordance with a second sidelink control information format (e.g., SCI 0-2). The first sidelink control information message may include information related to a priority of corresponding data, time and frequency resources allocated to the corresponding data, a resource reservation period, a demodulation reference signal (DMRS) pattern, an indication of the format used by the second sidelink control information message, a beta offset indicator, a number of DMRS ports, and a modulation and coding scheme indication. The indication of the format used by the second control information message may be used to indicate whether the data is for a single UE 115 or multiple UEs 115—e.g., used to indicate whether the data transmission is a groupcast transmission. The second sidelink control information message may include information related to a HARQ process ID for the corresponding data, a new data indicator, a redundancy version indicator, a source ID, a destination ID, and a channel state information (CSI) request. If the data transmission is a groupcast transmission, the second sidelink control information message may also include a zone ID and a communication range requirement indication.

A receiving device (e.g., an S/A) may receive sidelink communications in accordance with decoded sidelink control information. The receiving device may also report feedback in accordance with decoded sidelink control information (e.g., over PSFCH resources). Additionally, or alternatively, the receiving device may transmit reverse sidelink data to the transmitting device over reverse sidelink data resources scheduled by decoded sidelink control information.

In some examples, reverse sidelink data resources may be scheduled for a receiving device (e.g., an S/A) to transmit data to a transmitting device (e.g., a PLC), but the receiving device may not have data to transmit to the transmitting device—e.g., a data buffer at the receiving device may be empty or an amount of data ready for transmission to the transmitting device may below a threshold. Thus, the reverse sidelink data resources may be unused by the receiving device, decreasing a throughput of reverse sidelink communications scheduled by the transmitting device.

To increase the throughput of reverse sidelink communications, a transmitting device may poll one or more receiving devices to determine whether the one or more receiving devices have data to transmit to the transmitting device. In some examples, a transmitting device may transmit a polling request to a receiving device in sidelink control information that is associated with a sidelink data transmission. The polling request may be included in a sidelink control information message or in a MAC layer control message. The receiving device may respond to the polling request with an indication of whether there is data available for transmission to the transmitting device at the receiving device. The transmitting device may determine whether to schedule reverse sidelink resources for the receiving device to transmit the available data based on the response to the polling request.

Figure 2:
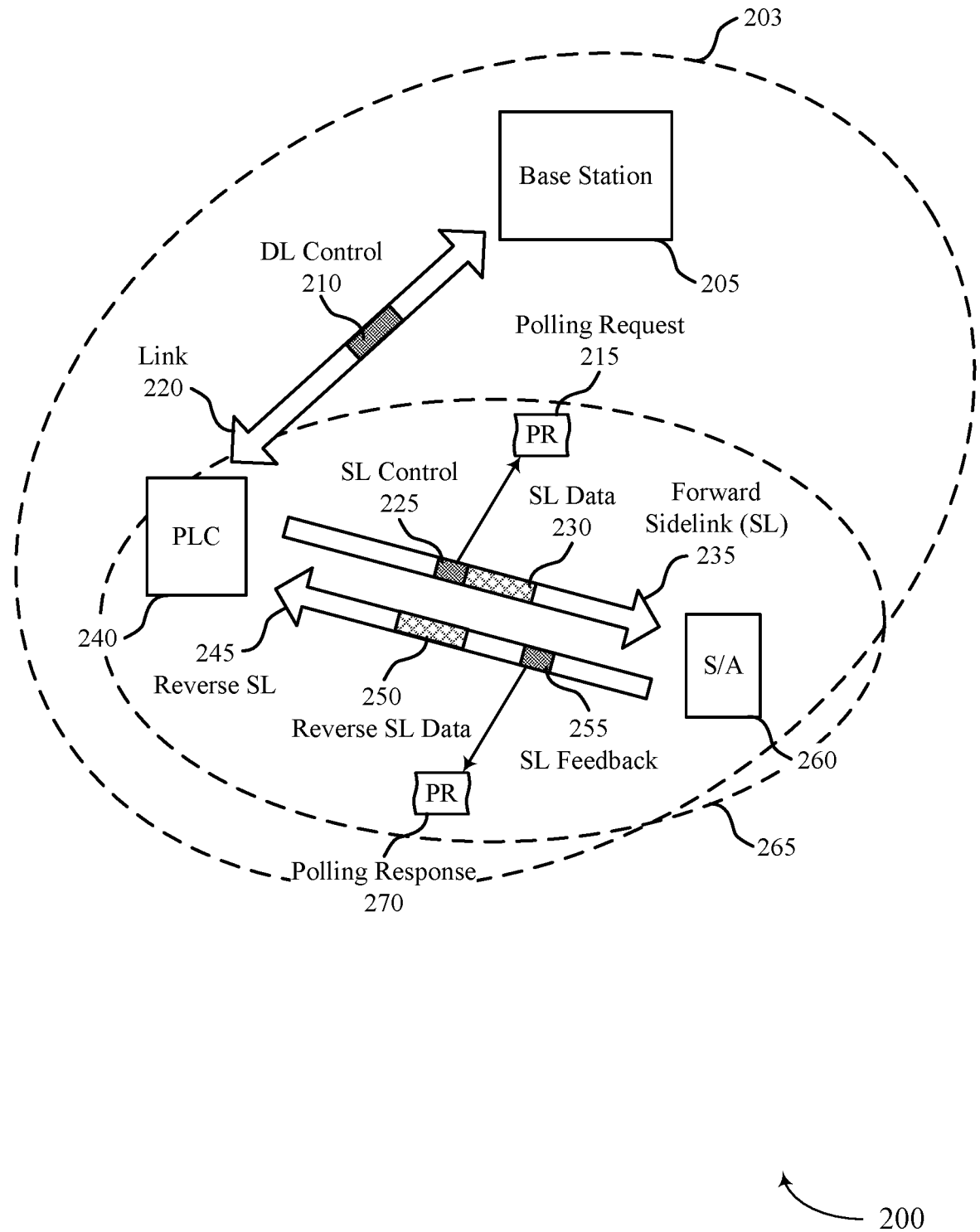
FIG. 2 illustrates an example of a wireless communications subsystem that supports scheduling request polling for sidelink communications in accordance with aspects of the present disclosure.

FIG. 2 illustrates an example of a wireless communications subsystem that supports scheduling request polling for sidelink communications in accordance with aspects of the present disclosure. Wireless communications subsystem 200 may include base station 205, PLC 240, and S/A 260.

Base station 205 may be an example of a base station 105 described with reference to FIG. 1. PLC 240 may be an example of a UE 115, as described with reference to FIG. 1, but may also perform functions associated with a base station, such as scheduling functions. S/A 260 may be an example of a sensor, actuator, or UE 115 described with reference to FIG. 1.

Base station 205 and PLC 240 may communicate with one another over link 220 within first coverage area 203, as described with reference to FIG. 1. In some examples, base station 205 and S/A 260 may similarly communicate with one another over a similar link. PLC 240 may transmit to S/A 260 over forward sidelink 235, and S/A 260 may transmit to PLC 240 over reverse sidelink 245 within second coverage area 265. In some examples, S/A 260 may transmit to PLC 240 over a similar sidelink, and PLC 240 may transmit to S/A 260 over a reverse sidelink—that is, the reverse sidelink may correspond to transmissions from a wireless device to a transmitting device that initiated a sidelink communication exchange.

In some examples, base station 205 may transmit, to PLC 240, downlink control information 210 to PLC 240 over link 220. Downlink control information 210 may be included in a downlink control information message that is configured in accordance with a downlink control information format (e.g., DCI 3_0), or in an RRC configuration message. Downlink control information 210 may indicate a set of communication resources (which may be referred to as sidelink resources) that are reserved for sidelink communications between wireless devices. PLC 240 may identity the sidelink resources based on downlink control information 210.

PLC 240 may transmit, to S/A 260, sidelink control information 225 and sidelink data 230 over forward sidelink 235. Sidelink control information 225 may include information used to indicate sidelink resources allocated for the transmission of sidelink data 230. Sidelink control information 225 may also include information about sidelink data (e.g., an associated HARQ version). Sidelink control information 225 may also include an indication of reverse sidelink resources for transmitting reverse sidelink data and/or reporting feedback.

In some examples, sidelink control information 225 is transmitted using sidelink control resources. In other examples, a first portion of sidelink control information 225 is transmitted using sidelink control resources (e.g., in a first sidelink control message), and a second portion of sidelink control information 225 is transmitted using sidelink data resources (e.g., in a second sidelink control message). When a first sidelink control message is transmitted using sidelink control resources, the first sidelink control message may be transmitted in accordance with a first sidelink control information format (e.g., SCI 0-1). When a second sidelink control message is transmitted using sidelink control resources, the second sidelink control message may be transmitted in accordance with a second sidelink control information format (e.g., SCI 0-2). In yet other examples, sidelink control information 225 may be transmitted using solely sidelink data resources. In some examples, sidelink control information 225 is included in MAC layer control signaling that is encapsulated in a header of a data message that carries sidelink data 230.

As described herein, sidelink control information 225 may include polling request 215. Polling request 215 may be used to solicit feedback from S/A 260 regarding an amount of data at S/A 260 that is ready for transmission to PLC 240. By transmitting a polling request in sidelink control information and with the transmission of sidelink data, PLC 240 may avoid scheduling reverse sidelink resources that go unused.

S/A 260 may transmit, to PLC 240, sidelink feedback 255 and/or reverse sidelink data 250 over reverse sidelink 245. Sidelink feedback 255 may include HARQ acknowledgment information, channel state information, and the like. As described herein, sidelink feedback 255 may also include polling response 270. Polling response 270 may be used to indicate an amount of data at S/A 260 that is ready to be transmit to PLC 240 when polling response 270 was received. In some examples, S/A 260 indicates that there is data to be transmit to PLC 240 if a data buffer at S/A 260 is not empty. In other examples, S/A 260 indicates that there is data to be transmit to PLC 240 if an amount of data in the data buffer at S/A 260 is above a threshold. Polling request 215 may include, or be, a scheduling request. In some examples, S/A 260 may follow up with a transmission of a sidelink MAC layer buffer status report that indicates the amount of data ready to be transmit from S/A 260, In other examples, polling request 215 may include, or be, a simplified buffer status report and may indicate an amount of data ready to be transmit from S/A 260 with less granularity than a MAC layer buffer status report.

In some examples, if polling response 270 includes an indication that S/A 260 has data to transmit to PLC 240, PLC 240 transmits a reverse sidelink grant to S/A 260 indicating reverse sidelink data resources that are allocated to S/A 260. S/A 260 may transmit reverse sidelink data 250 to PLC 240 during the scheduled reverse sidelink data resources.

Figure 3:
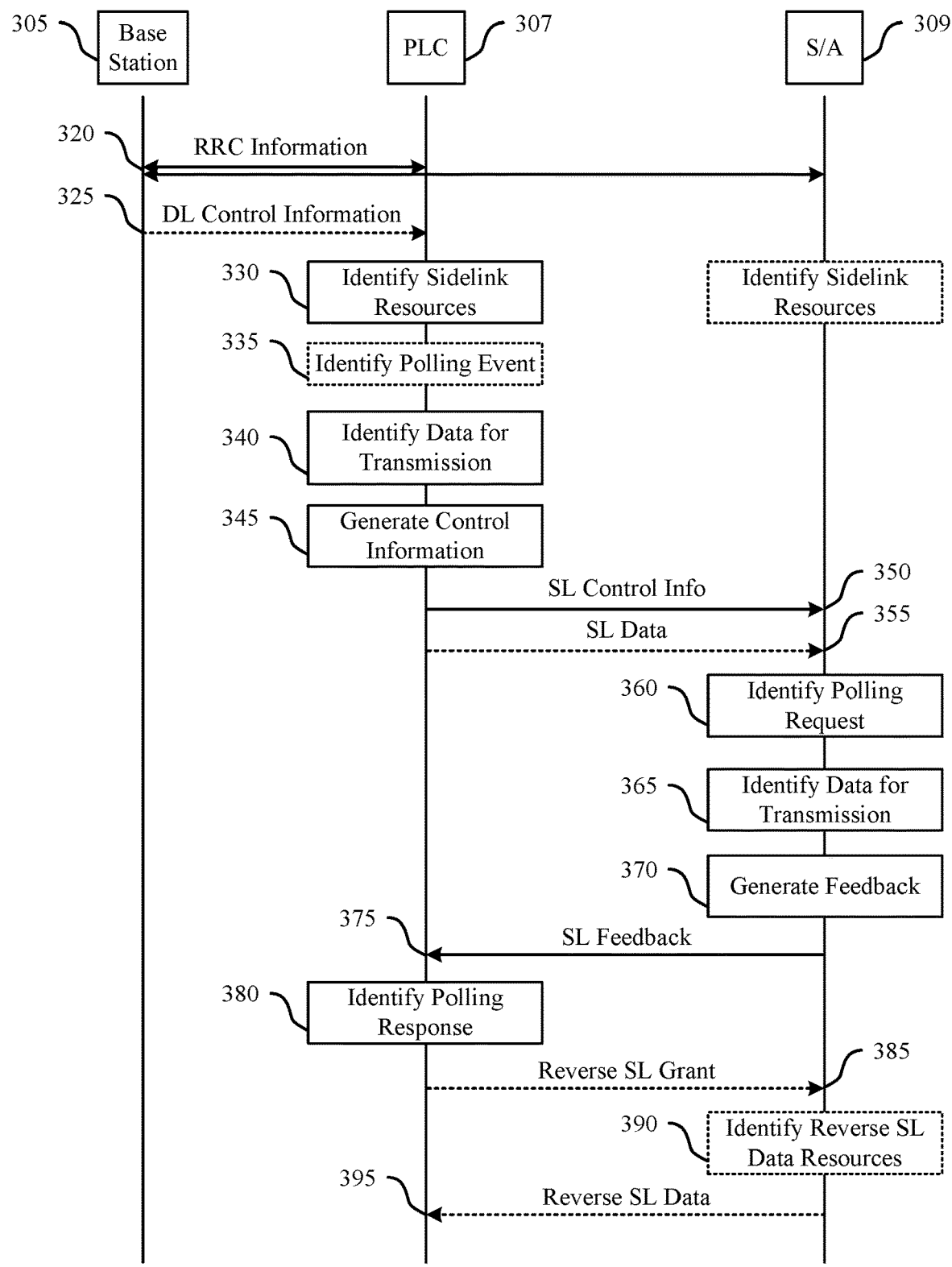
FIG. 3 illustrates an example of a process for scheduling request polling for sidelink communications in accordance with aspects of the present disclosure.

FIG. 3 illustrates an example of a process flow that supports scheduling request polling for sidelink communications in accordance with aspects of the present disclosure. Process flow 300 may be performed by base station 305, PLC 307, and S/A 309.

Base station 305 may be an example of a base station 105 or base station 205 as described with reference to FIGS. 1 and 2. PLC 307 may be an example of PLC 240, as described with reference to FIG. 2. S/A 309 may be an example of S/A 260, as described with reference to FIG. 2.

In some examples, process flow 300 illustrates an exemplary sequence of operations performed to support scheduling request polling for sidelink communications. For example, process flow 300 depicts the transmission of a polling request to an S/A and the receiving of a polling response from the S/A.

One skilled in the art would understand that one or more of the operations described in process flow 300 may be performed earlier or later in the process, omitted, replaced, supplemented, or any combination thereof. Also, additional operations described herein that are not included in process flow 300 may be included.

At arrow 320, base station 305, PLC 307 and S/A 309 may exchange RRC information with one another. In some examples, PLC 307 indicates a capability to send polling requests for sidelink communications, and S/A 309 indicates a capability to respond to polling requests for sidelink communications. In some examples, S/A 309 receives a configuration message (from base station 305 or PLC 307) including a group ID for the S/A 309, where the group ID is used by a transmitting device to simultaneously transmit to multiple receiving devices in a group. In some examples, S/A 309 receives a configuration message (from base station 305 or PLC 307) including a schedule for monitoring for polling requests. For example, S/A 309 may be configured to monitor for polling requests during odd-numbered time intervals (e.g., odd time slots, odd subframes, etc.), while other receiving devices may be configured to monitor for polling requests during even-numbered time intervals—e.g., during an occurrence of sidelink resources. In some examples, PLC 307 and/or S/A 309 receive, from base station 305, a configuration message indicating communication resources that are periodically scheduled for sidelink communications.

At arrow 325, base station 305 may transmit a downlink control information message to PLC X07 indicating a location of communication resources that are reserved for sidelink communications (or sidelink resources). In some examples, the downlink control information dynamically schedules a set of sidelink resources. In other examples, the downlink control information semi-statically schedules sets of sidelink resources. The downlink control information message may be constructed in accordance with a downlink control information format, such as DCI 3_0.

At block 330, PLC 307 may identify the sidelink resources that are reserved for sidelink communications—e.g., based on RRC configuration signaling or a received DCI message. S/A 309 may also identify the sidelink resources—e.g., based on the RRC configuration signaling.

At block 335, PLC 307 may identify a polling event that queues up a polling request. That is, PLC 307 may be configured to generate a polling request and transmitting the polling request in a next available sidelink resource based on the polling event occurring. In some examples, the polling event occurs based on a duration of time since a transmission of a last polling request elapsing. In some examples, the polling event occurs based on PLC 307 receiving data for a receiving device (e.g., S/A 309).

At block 340, PLC 307 may identify data for transmitting over a next occurrence of sidelink resources. In some examples, PLC 307 identifies data for a group of receiving devices (that includes S/A 309). In some examples, PLC 307 identifies data for a single receiving device (e.g., S/A 309). In some examples, PLC 307 identifies that no data is available to be transmitted to the group of receiving devices or to the single device in the next occurrence of the sidelink resources.

At block 345, PLC 307 may generate control information that is used to schedule a sidelink data transmission. In some examples, PLC 307 generates a first sidelink control information message in accordance with a first sidelink control information format (e.g., SCI 0-1). PLC 307 may also generate a second sidelink control information message in accordance with a second sidelink control information format (e.g., SCI 0-2). The first sidelink control information may be scheduled for transmission over PSCCH resources and the second sidelink control information may be scheduled for transmission over PSSCH resources (or over PSCCH resources that are interleaved with PSSCH resources). PLC 307 may also be configured to generate MAC layer control signaling (e.g., MAC-CEs) that supports communications between PLC 307 and S/A 309. The MAC layer control signaling may be included in a header of a data message included in the sidelink data transmission.

In some examples, PLC 307 includes the polling request in the generated control information. PLC 307 may include an indication of the polling request in the first sidelink control information message—e.g., by assigning a specific value to a field in the first sidelink control information message used to indicate a format of the second sidelink control information message. Alternatively, PLC 307 may include the polling request in the second sidelink control information message. In some examples, PLC 307 uses a CSI request field to request CSI and polling information from one or more receiving devices. In other examples, PLC 307 uses a field in the second sidelink control information message that is dedicated to carrying the polling request. In some examples (e.g., if PLC 307 transmits groupcast data), the second sidelink control information message may also be used to indicate a group of receiving devices (e.g., including S/A 309) for which the polling request is intended—e.g., by including a subgroup ID or bit map in the second sidelink control information message.

In some examples, in addition to the polling request, PLC 307 configures the first sidelink control information message and/or the second sidelink control information message to indicate that a corresponding data transmission is absent of data. That is, PLC 307 may configure the first and/or second sidelink control information to indicate an absence of data in a corresponding data transmission. In some examples, PLC 307 may indicate the absence of data after determining that there is an insufficient amount of available sidelink resources to convey data that is available to transmit to one or more receiving devices. However, PLC 307 may still transmit the sidelink control information to convey the polling request over control and/or data sidelink resources—e.g., based on a polling event previously being identified. In some examples, the absence of data is indicated using a combination of fields included in a first sidelink control information message and/or a second sidelink control information message—e.g., by setting the bits including in a priority field, resource reservation period, DMRS pattern field, and number of DMRS port fields of a first data message to a same logic value (e.g., logic value 1).

In some examples, PLC 307 includes the polling request in the MAC layer control information—e.g., PLC 307 may generate a sidelink buffer status report MAC-CE that is used to convey the polling request and to trigger a buffer status report from S/A 309. By including the polling request in the MAC layer control information, rather than the sidelink control information, a polling request may be communicated without any modification to the sidelink control information.

At arrow 350, PLC 307 may transmit sidelink control information to one or more receiving devices (including S/A 309). The sidelink control information may be used to schedule a corresponding data transmission, identifying a location of resources used for the corresponding data transmission. The sidelink control information may also be used to indicate information about the data transmission (e.g., a HARQ version) and to indicate a location of feedback resources on a reverse sidelink. The sidelink control information may also include an indication of whether the corresponding data transmission is intended for one or multiple receiving devices—i.e., whether the corresponding data transmission is a unicast or multicast transmission. The sidelink control information may also include a polling request—e.g., if the first and/or second sidelink control information has been configured to convey the polling request. The sidelink control information may additionally include an indication that data resources allocated to a corresponding data transmission includes an absence of data.

At arrow 355, PLC 307 may transmit data that corresponds to the control information. In some examples, the data is transmitted after the control information—e.g., after the first control information message. In some examples, the data is transmitted concurrently with the control information—e.g., with the second control information message. In some examples, no data is transmitted—e.g., if an insufficient amount of sidelink data resources is available for conveying the data. In such cases, the control information may include an indication that the sidelink data resources scheduled for the data transmission contain an absence of data. In some examples, the data transmission includes a MAC layer header that includes one or more MAC-CEs, including a MAC-CE carrying a polling a request (e.g., a sidelink buffer status report MAC-CE). In such cases, the sidelink control information message may not be configured to support carrying a polling request.

At block 360, S/A 309 may identify a polling request in a control and/or data transmission received from PLC 307. In some examples, S/A 309 identifies the polling request in a first sidelink control information message received from PLC 307 over PSCCH resources. In some examples, S/A 309 identifies the polling request in a second sidelink control information message received from PLC 307 over PSSCH resources. In some examples, S/A 309 identifies the polling request using a combination of the first and second sidelink control information messages. In some examples, S/A 309 identifies the polling request in a MAC header of a data transmission received from PLC 307—e.g., in a sidelink buffer status report MAC-CE.

In some examples, S/A 309 monitors for the polling request when the polling request is included in a groupcast transmission that is transmit within a designated interval. In some examples, S/A 309 identifies that the polling request is intended for a group of receiving devices, including S/A 309, when the sidelink control information indicates a group ID shared by S/A 309.

At block 365, S/A 309 may identify whether data that is available to be transmit to PLC 307 based on identifying a polling request that is intended for S/A 309 In some examples, S/A 309 may determine whether data is available to be transmit to PLC 307 by checking a data buffer at S/A 309. In some examples, if the data buffer at S/A 309 is empty, S/A 309 may determine that there is no data available to be transmit to PLC 307. And if the data buffer at S/A 309 is not empty, S/A 309 may determine that there is data available to be transmit to PLC 307. In other examples, if the data buffer at S/A 309 is below a threshold, S/A 309 may determine that there is no data available to be transmit to PLC 307.

In some examples, S/A 309 may calculate an amount of data that is likely to (or will) be available for transmission within a designated interval (e.g., within a 10 ms interval). In such examples, if the data buffer at S/A 309 is empty or below a threshold at the time the polling request is received, S/A 309 may determine that there is data available to be transmit to PLC 307 if the calculated amount of data (or a summation of the calculated amount of data and the buffered amount of data) exceeds a threshold.

At block 370, S/A 309 may generate feedback associated with the sidelink transmission received from PLC 307. S/A 309 may generate HARQ feedback for a data message included in the sidelink transmission. S/A 309 may also generate CSI feedback based on receiving a request for CSI feedback in a sidelink control information message included in the sidelink transmission. In some examples, S/A 309 refrains from generating HARQ and/or CSI feedback based on receiving an absence of data indication in the received sidelink control information.

Additionally, or alternatively, S/A 309 may generate a polling response to a polling request included in a control or data portion of the sidelink transmission. In some examples, S/A 309 generates a scheduling request in response to the polling request—e.g., if S/A 309 identifies that there is data available for transmission to PLC 307. In other examples, S/A 309 generates a simplified buffer status report after identifying that there is data available for transmission to PLC 307. A single bit may be used to indicate the scheduling request, while multiple bits may be used to indicate the simplified buffer status report. The simplified buffer status report may be used to indicate that an amount of data available for transmission to PLC 307 is within one of multiple ranges. In some examples, after generating a scheduling request, S/A 309 may subsequently generate a MAC layer sidelink buffer status report that is to be transmitted in a subsequent transmission to PLC 307—e.g., using a MAC-CE.

In some examples, S/A 309 generates a no scheduling request in response to the polling request—e.g., if S/A 309 identifies that there is not data available for transmission to PLC 307. In other examples, S/A 309 refrains from generating any polling response if S/A 309 identifies that there is not data available for transmission to PLC 307.

At arrow 375, S/A 309 may transmit sidelink feedback for a received sidelink transmission to PLC 307. The sidelink feedback may include HARQ information, channel state information, and/or polling information. S/A 309 may transmit the sidelink feedback over PSFCH resources scheduled by the sidelink control information received in the sidelink transmission. In some examples, S/A 309 may transmit a first set of sidelink feedback (e.g., HARQ information and channel state information) over a first PSFCH resource and may transmit a second set of sidelink feedback (e.g., the polling information) over a separate (e.g., non-overlapping) PSFCH resource. In other examples, S/A 309 may transmit all of the sidelink feedback over a single, or overlapping, PSFCH resources. In such cases, S/A 309 may multiplex the feedback information—e.g., by applying different cyclic shifts of a same Zadoff-Chu sequence to different types of sidelink feedback transmitted over a physical resource block. In some examples, after transmitting feedback information including a scheduling request, S/A 309 may transmit a follow-up reverse sidelink transmission that includes a buffer status report in a MAC header of the reverse sidelink transmission. When S/A 309 receives an absence of data indication in the sidelink transmission, S/A 309 may refrain from transmitting HARQ information and/or channel state information and may transmit the polling information over PSFCH resources allocated to the HARQ and channel state information.

At block 380, PLC 307 may identify a polling response received from one or more receiving devices, including S/A 309. PLC 307 may determine whether S/A 309 has data that is available for transmission to PLC 307, and in some cases, an amount of data that S/A 309 has to transmit to PLC 307 based on the polling response. In some examples, PLC 307 may determine that S/A 309 has no available data (or an amount of available data that is below a threshold) for transmission to PLC 307. In such cases, PLC 307 may refrain from scheduling reverse sidelink resources for S/A 309 to transmit to PLC 307. By avoiding scheduling reverse sidelink resources to S/A 309, PLC 307 may avoid scheduling unused resources and may free up the resources to be scheduled to a different receiving device, increasing a throughput of the reverse sidelink. In other examples, PLC 307 may determine that S/A 309 has available data (or a sufficient amount of data) for transmission to PLC 307. Thus, PLC 307 may schedule reverse sidelink resources for S/A 309.

At arrow 385, PLC 307 may transmit a reverse sidelink grant to S/A 309 that indicates a location of reverse sidelink resources dedicated to S/A 309 based on determining that S/A 309 has a sufficient amount of available data (e.g., any available data) to transmit to PLC 307.

At block 390, S/A 309 may identify the reverse sidelink resources indicated in the reverse sidelink grant. At arrow 395, S/A 309 may transmit data that is available for transmission to PLC 307 during the reverse sidelink resources.

Although the above process is generally discussed in the context of PLC 307 scheduling resource for communications between PLC 307 and S/A 309, the above process may be similarly performed by PLC 307 with other PLCs, by an S/A with one or more PLCs, by an S/A with other S/As, and the like.

Figure 4:
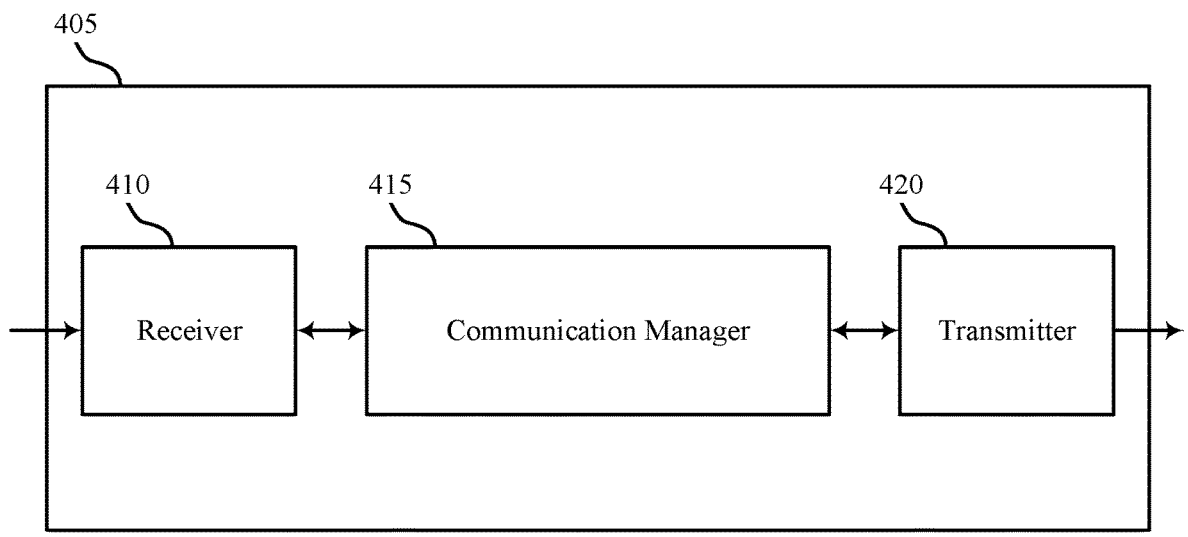
FIGS. 4 and 5 show block diagrams of devices that support scheduling request polling for sidelink communications in accordance with aspects of the present disclosure.

FIG. 4 shows a block diagram 400 of a device 405 that supports scheduling request polling for sidelink communications in accordance with aspects of the present disclosure. The device 405 may be an example of aspects of a PLC or S/A as described herein. The device 405 may include a receiver 410, a communication manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to scheduling request polling for sidelink communications, etc.). Information may be passed on to other components of the device 405. The receiver 410 may utilize a single antenna or a set of antennas.

The transmitter 420 may transmit signals generated by other components of the device 405. In some examples, the transmitter 420 may be collocated with a receiver 410 in a transceiver module. The transmitter 420 may utilize a single antenna or a set of antennas.

The communication manager 415 may be an example of means for performing various aspects of scheduling request polling for sidelink communications as described herein. The communication manager 415, or its sub-components, may be implemented in hardware, code (e.g., software or firmware) executed by a processor, or any combination thereof. If implemented in code executed by a processor, the functions of the communication manager 415, or its subcomponents may be executed by a general-purpose processor, a digital signal processor (DSP), a central processing unit (CPU) an application-specific integrated circuit (ASIC), a field-programmable gate array (FPGA) or other programmable logic device, discrete gate or transistor logic, discrete hardware components, or any combination thereof designed to perform the functions described in the present disclosure. In some examples, the communication manager 415 may be configured to perform various operations (e.g., receiving, monitoring, transmitting) using or otherwise in cooperation with the receiver 410, the transmitter 420, or both.

The communication manager 415 may support wireless communication at a first wireless device (e.g., a PLC) in accordance with examples as disclosed herein. For example, the communication manager 415 may be configured to support receiving an indication of sidelink communication resources that are reserved for sidelink transmissions. The communication manager 415 may be configured to support transmitting a polling request in control information that is associated with a data transmission from the first wireless device using the sidelink communication resources. The communication manager 415 may be configured to support receiving, from a second wireless device in response to the polling request, feedback including an indication of an availability of data for transmission to the first wireless device.

The communication manager 415 may support wireless communication at a first wireless device (e.g., an S/A) in accordance with examples as disclosed herein. For example, the communication manager 415 may be configured to support receiving a polling request in control information that is associated with a data transmission from the first wireless device using sidelink communication resources that are reserved for sidelink transmissions. The communication manager 415 may be configured to support transmitting, to a second wireless device in response to the polling request, feedback including an indication of an availability of data for transmission to the second wireless device.

The communication manager 415 as described herein may be implemented to realize one or more potential advantages. One implementation may allow for reverse sidelink throughput to be improved. That is, by polling devices (e.g., a PLC or S/A) to determine whether the devices have data to transmit before scheduling reverse sidelink resources for the devices, a scheduling device (e.g., a PLC) may avoid scheduling sidelink resources for devices that do not have data to transmit (and may allocate the saved resources to devices that do have data to transmit). Another implementation may allow for sidelink polling to be performed without modifications to physical layer protocols. That is, by including a polling request in MAC layer control signaling, the polling request may be conveyed to receiving devices without modification to a downlink control information format.

Figure 5:
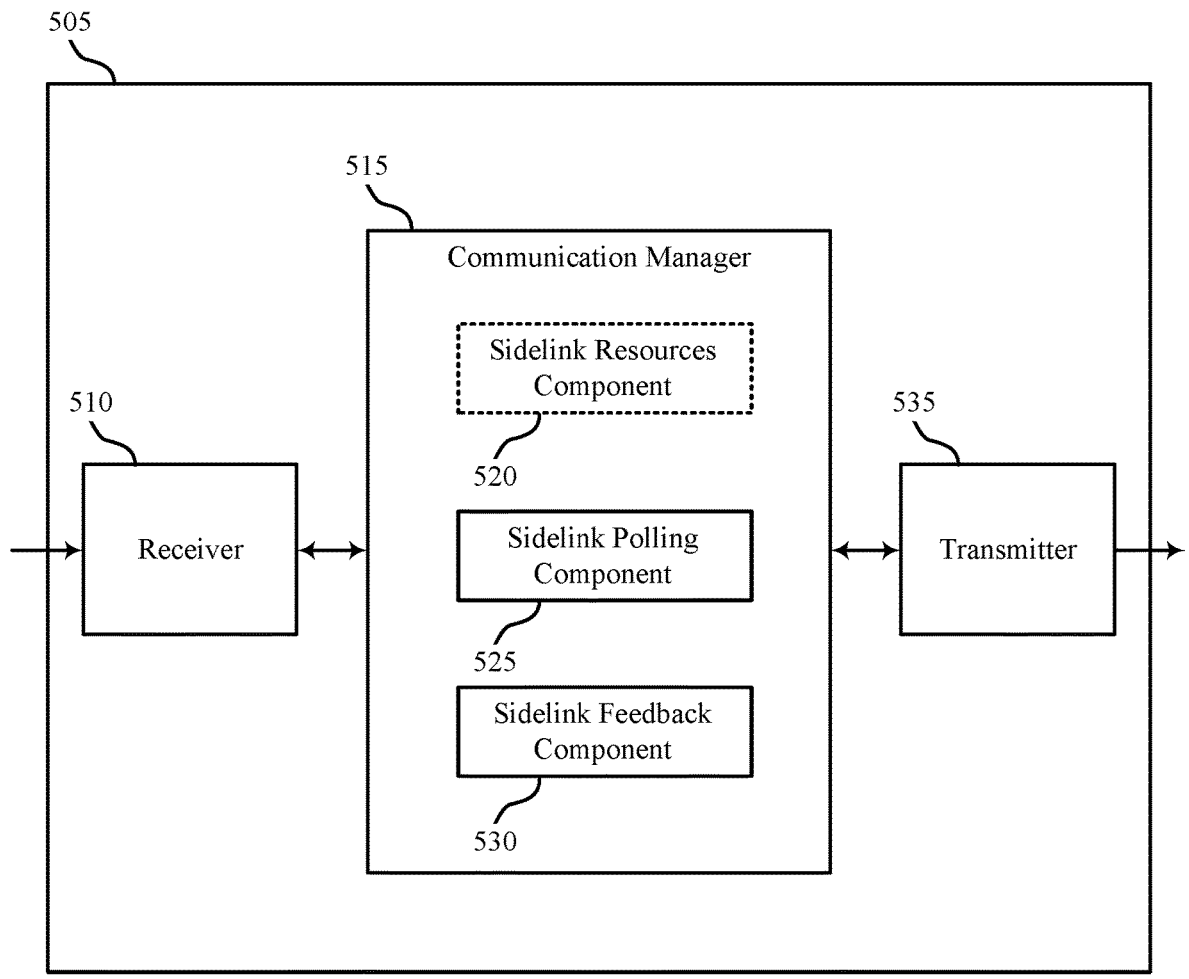

FIG. 5 shows a block diagram 500 of a device 505 that supports scheduling request polling for sidelink communications in accordance with aspects of the present disclosure. The device 505 may be an example of aspects of a device 405 or a UE 115 as described herein. The device 505 may include a receiver 510, a communication manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to scheduling request polling for sidelink communications, etc.). Information may be passed on to other components of the device 505. The receiver 510 may utilize a single antenna or a set of antennas.

The transmitter 535 may transmit signals generated by other components of the device 505. In some examples, the transmitter 535 may be collocated with a receiver 510 in a transceiver module. The transmitter 535 may utilize a single antenna or a set of antennas.

The communication manager 515, or various component thereof, may be an example of means for performing various aspects of scheduling request polling for sidelink communications as described herein. For example, the communication manager 515 may include a sidelink resources component 520, a sidelink polling component 525, and a sidelink feedback component 530. The communication manager 515 may be an example of aspects of the communication manager 415 described with reference to FIG. 4. In some examples, the communication manager 415 may be configured to perform various operations (e.g., receiving, monitoring, transmitting) using or otherwise in cooperation with one or both of the receiver 410 or the transmitter 435.

The communication manager 515 may support wireless communication at a first wireless device (e.g., a PLC) in accordance with examples as disclosed herein. The sidelink resources component 520 may be configured to support receiving an indication of sidelink communication resources that are reserved for sidelink transmissions. The sidelink polling component 525 may be configured to support transmitting a polling request in control information that is associated with a data transmission from the first wireless device using the sidelink communication resources. The sidelink feedback component 530 may be configured to support receiving, from a second wireless device in response to the polling request, feedback including an indication of an availability of data for transmission to the first wireless device.

The communication manager 515 may support wireless communication at a first wireless device (e.g., an S/A) in accordance with examples as disclosed herein. Additionally or alternatively, the sidelink polling component 525 may be configured to support receiving a polling request in control information that is associated with a data transmission from the first wireless device using sidelink communication resources that are reserved for sidelink transmissions. The sidelink feedback component 530 may be configured to support transmitting, to a second wireless device in response to the polling request, feedback including an indication of an availability of data for transmission to the second wireless device.

Figure 6:
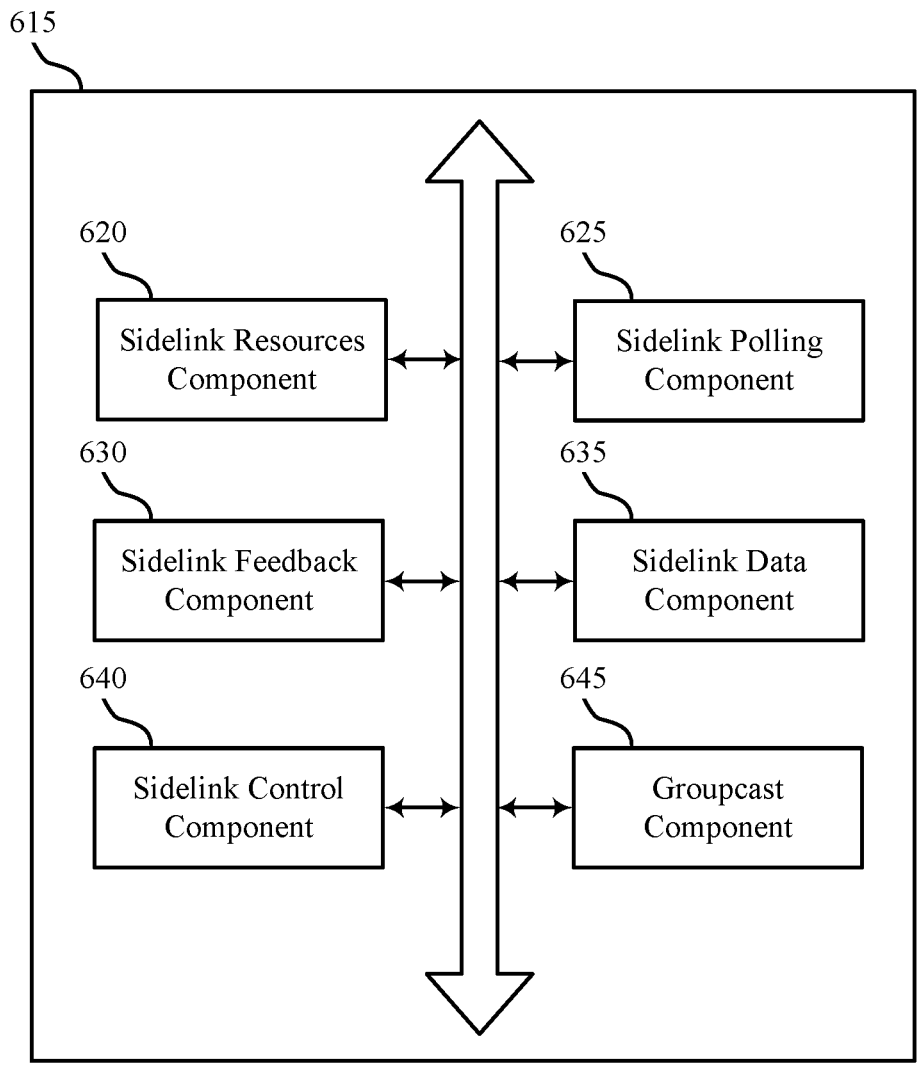
FIG. 6 shows a block diagram of a communication manager that supports scheduling request polling for sidelink communications in accordance with aspects of the present disclosure.

FIG. 6 shows a block diagram 600 of a communication manager 615 that supports scheduling request polling for sidelink communications in accordance with aspects of the present disclosure. The communication manager 615 may be an example of aspects of a communication manager 415, a communication manager 515, or any combination thereof as described herein. The communication manager 615, or various components thereof, may be an example of means for performing various aspects of scheduling request polling for sidelink communications. For example, the communication manager 615 may include a sidelink resources component 620, a sidelink polling component 625, a sidelink feedback component 630, a sidelink data component 635, a sidelink control component 640, a groupcast component 645, or any combination thereof. Each of these components may communicate, directly or indirectly, with one another (e.g., via one or more buses).

The communication manager 615 may support wireless communication at a first wireless device (e.g., a PLC) in accordance with examples as disclosed herein. The sidelink resources component 620 may be configured to support receiving an indication of sidelink communication resources that are reserved for sidelink transmissions. The sidelink polling component 625 may be configured to support transmitting a polling request in control information that is associated with a data transmission from the first wireless device using the sidelink communication resources. The sidelink feedback component 630 may be configured to support receiving, from a second wireless device in response to the polling request, feedback including an indication of an availability of data for transmission to the first wireless device.

In some examples, to transmit the polling request, the sidelink polling component 625 may be configured to support transmitting the polling request in sidelink control information using sidelink control channel resources of the sidelink communication resources, sidelink data channel resources of the sidelink communication resources, or a combination thereof.

In some examples, to transmit the polling request, the sidelink control component 640 may be configured to support transmitting the polling request in first sidelink control information or second sidelink control information, wherein the first sidelink control information uses the sidelink control channel resources in accordance with a first sidelink control information format and is used to schedule the second sidelink control information and data transmission over the sidelink data channel resources. In some examples, a field in the first sidelink control information is configured to indicate the second sidelink control information format for the second sidelink control information includes the polling request.

In some examples, to transmit the polling request, the sidelink control component 640 may be configured to support transmitting the polling request in first sidelink control information that is transmitted during an occurrence of the sidelink data channel resources in accordance with a first sidelink control information format and is used to indicate characteristics of the data transmission. In some examples, a first field in the second sidelink control information is used to request channel state information from the second wireless device includes the polling request. In some examples, a second field in the second sidelink control information is used to indicate polling requests includes the polling request. In some examples, a field in the first sidelink control information is used to indicate that the polling request is for a group of wireless devices of a set of groups of wireless devices. In some examples, the groupcast component 645 may be configured to support transmitting, to the second wireless device, an indication that the second wireless device is included in the group of wireless devices.

In some examples, the groupcast component 645 may be configured to support transmitting, to the group of wireless devices, a configuration that configures the group of wireless devices to monitor for polling requests during a set of time intervals that includes the time interval.

In some examples, to receive the feedback, the sidelink feedback component 630 may be configured to support receiving, from the second wireless device, a scheduling request using sidelink feedback channel resources of the sidelink communication resources.

In some examples, the sidelink feedback component 630 may be configured to support determining that the second wireless device has data to transmit to the first wireless device based on the scheduling request.

In some examples, the sidelink control component 640 may be configured to support receiving a medium access control-control element including a buffer status report indicating an amount of data available for transmission from the second wireless device based on receiving the scheduling request. In some examples, the sidelink resources component 620 may be configured to support determining the amount of data available for transmission from the second wireless device based on the buffer status report.

In some examples, to receive the feedback, the sidelink resources component 620 may be configured to support receiving, from the second wireless device, an indication of an amount of data available for transmission from the second wireless device using sidelink feedback channel resources.

In some examples, the sidelink resources component 620 may be configured to support determining the amount of data available for transmission from the second wireless device based on the indication.

In some examples, to receive the feedback, the sidelink feedback component 630 may be configured to support receiving the feedback for the polling request using sidelink feedback channel resources.

In some examples, the sidelink feedback component 630 may be configured to support receiving second feedback for a data message included in the data transmission, where the second feedback is received using the sidelink feedback channel resources, the second feedback being multiplexed with the feedback.

In some examples, the sidelink feedback component 630 may be configured to support receiving second feedback for a data message included in the data transmission, where the second feedback is received using second sidelink feedback channel resources that are non-overlapping with the sidelink feedback channel resources.

In some examples, the sidelink data component 635 may be configured to support transmitting a data message in the data transmission, where the control information provides characteristics of the data message.

In some examples, the sidelink resources component 620 may be configured to support determining that an amount of data available to be transmitted from the second wireless device is below a threshold based on the feedback. In some examples, the sidelink resources component 620 may be configured to support refraining from scheduling reverse sidelink resources for the second wireless device based on the amount of data being below the threshold.

In some examples, the sidelink resources component 620 may be configured to support determining that an amount of data available to be transmitted from the second wireless device is above a threshold based on the feedback. In some examples, the sidelink resources component 620 may be configured to support scheduling reverse sidelink resources for the second wireless device based on the amount of data being above the threshold.

In some examples, the sidelink control component 640 may be configured to support transmitting, in the control information, an indication of an absence of data in the data transmission.

In some examples, one or more fields in the control information being used to indicate the absence of data in the data transmission.

In some examples, each of a set of bits corresponding to the one or more fields are set to a first value.

In some examples, the sidelink polling component 625 may be configured to support identifying a polling event for the second wireless device prior to an occurrence of sidelink data channel resources of the sidelink communication resources. In some examples, the sidelink data component 635 may be configured to support determining that the sidelink data channel resources are insufficient for conveying the data transmission, where the indication of the absence of data is included in the control information based on the sidelink data channel resources being insufficient for conveying the data transmission.

In some examples, to transmit the polling request, the sidelink control component 640 may be configured to support transmitting a medium access control-control element that includes the polling request in the data transmission, the control information being medium access control layer control information.

In some examples, to receive the feedback, the sidelink feedback component 630 may be configured to support receiving, in response to the polling request, a buffer status report using sidelink feedback channel resources.

In some examples, the sidelink feedback component 630 may be configured to support receiving second feedback for a data message included in the data transmission, where the second feedback is received using the sidelink feedback channel resources, the second feedback being multiplexed with the feedback.

In some examples, the sidelink feedback component 630 may be configured to support receiving second feedback for a data message included in the data transmission, where the second feedback is received using second sidelink feedback channel resources that are non-overlapping with the sidelink feedback channel resources.

In some examples, the sidelink control component 640 may be configured to support generating the medium access control-control element. In some examples, the sidelink data component 635 may be configured to support encapsulating the medium access control-control element in a header of a data message included in the data transmission.

The communication manager 615 may support wireless communication at a first wireless device (e.g., an S/A) in accordance with examples as disclosed herein. In some examples, the sidelink polling component 625 may be configured to support receiving a polling request in control information that is associated with a data transmission from the first wireless device using sidelink communication resources that are reserved for sidelink transmissions. In some examples, the sidelink feedback component 630 may be configured to support transmitting, to a second wireless device in response to the polling request, feedback including an indication of an availability of data for transmission to the second wireless device.

In some examples, to receive the polling request, the sidelink polling component 625 may be configured to support receiving the polling request in sidelink control information using sidelink control channel resources of the sidelink communication resources, sidelink data channel resources of the sidelink communication resources, or a combination thereof.

In some examples, to receive the polling request, the sidelink control component 640 may be configured to support receiving the polling request in first sidelink control information or second sidelink control information, wherein the first sidelink control information uses the sidelink control channel resources in accordance with a first sidelink control information format and is used to schedule the second sidelink control information and data transmission over the sidelink data channel resources. In some examples, a field in the first sidelink control information is configured to indicate the second sidelink control information format for the second sidelink control information includes the polling request.

In some examples, to receive the polling request, the sidelink control component 640 may be configured to support receiving the polling request in first sidelink control information that is transmitted during an occurrence of the sidelink data channel resources in accordance with a first sidelink control information format and is used to indicate characteristics of the data transmission. In some examples, a first field in the second sidelink control information is used to request channel state information from the first wireless device includes the polling request. In some examples, a second field in the second sidelink control information is used to indicate polling requests includes the polling request. In some examples, a field in the first sidelink control information is used to indicate that the polling request is for a group of wireless devices of a set of groups of wireless devices.

In some examples, the groupcast component 645 may be configured to support receiving, from the second wireless device, an indication that the first wireless device is included in the group of wireless devices.

In some examples, the groupcast component 645 may be configured to support receiving a configuration that configures the first wireless device to monitor for polling requests during a set of time intervals that includes the time interval.

In some examples, to transmit the feedback, the sidelink feedback component 630 may be configured to support transmitting, to the second wireless device, a scheduling request using sidelink feedback channel resources of the sidelink communication resources.

In some examples, the sidelink feedback component 630 may be configured to support transmitting a medium access control-control element including a buffer status report indicating an amount of data available for transmission from the first wireless device based on receiving the scheduling request.

In some examples, to transmit the feedback, the sidelink feedback component 630 may be configured to support transmitting, to the second wireless device, an indication of an amount of data available for transmission from the first wireless device using sidelink feedback channel resources.

In some examples, to transmit the feedback, the sidelink feedback component 630 may be configured to support transmitting the feedback for the polling request using sidelink feedback channel resources.

In some examples, the sidelink feedback component 630 may be configured to support transmitting second feedback for a data message included in the data transmission using the sidelink feedback channel resources, the second feedback being multiplexed with the feedback.

In some examples, the sidelink feedback component 630 may be configured to support transmitting second feedback for a data message included in the data transmission using second sidelink feedback channel resources that are non-overlapping with the sidelink feedback channel resources.

In some examples, the sidelink data component 635 may be configured to support receiving, in the control information, an indication of an absence of data in the data transmission. In some examples, one or more fields in the control information being used to indicate the absence of data in the data transmission. In some examples, each of a set of bits corresponding to the one or more fields are set to a first value.

In some examples, to receive the polling request, the sidelink control component 640 may be configured to support receiving a medium access control-control element that includes the polling request in a header of the data transmission, the control information being medium access control layer control information.

In some examples, to transmit the feedback, the sidelink feedback component 630 may be configured to support transmitting, in response to the polling request, a buffer status report using sidelink feedback channel resources.

In some examples, the sidelink feedback component 630 may be configured to support transmitting second feedback for a data message included in the data transmission, where the second feedback is received using the sidelink feedback channel resources, the second feedback being multiplexed with the feedback.

In some examples, the sidelink feedback component 630 may be configured to support transmitting second feedback for a data message included in the data transmission, where the second feedback is received using second sidelink feedback channel resources that are non-overlapping with the sidelink feedback channel resources.

Figure 7:
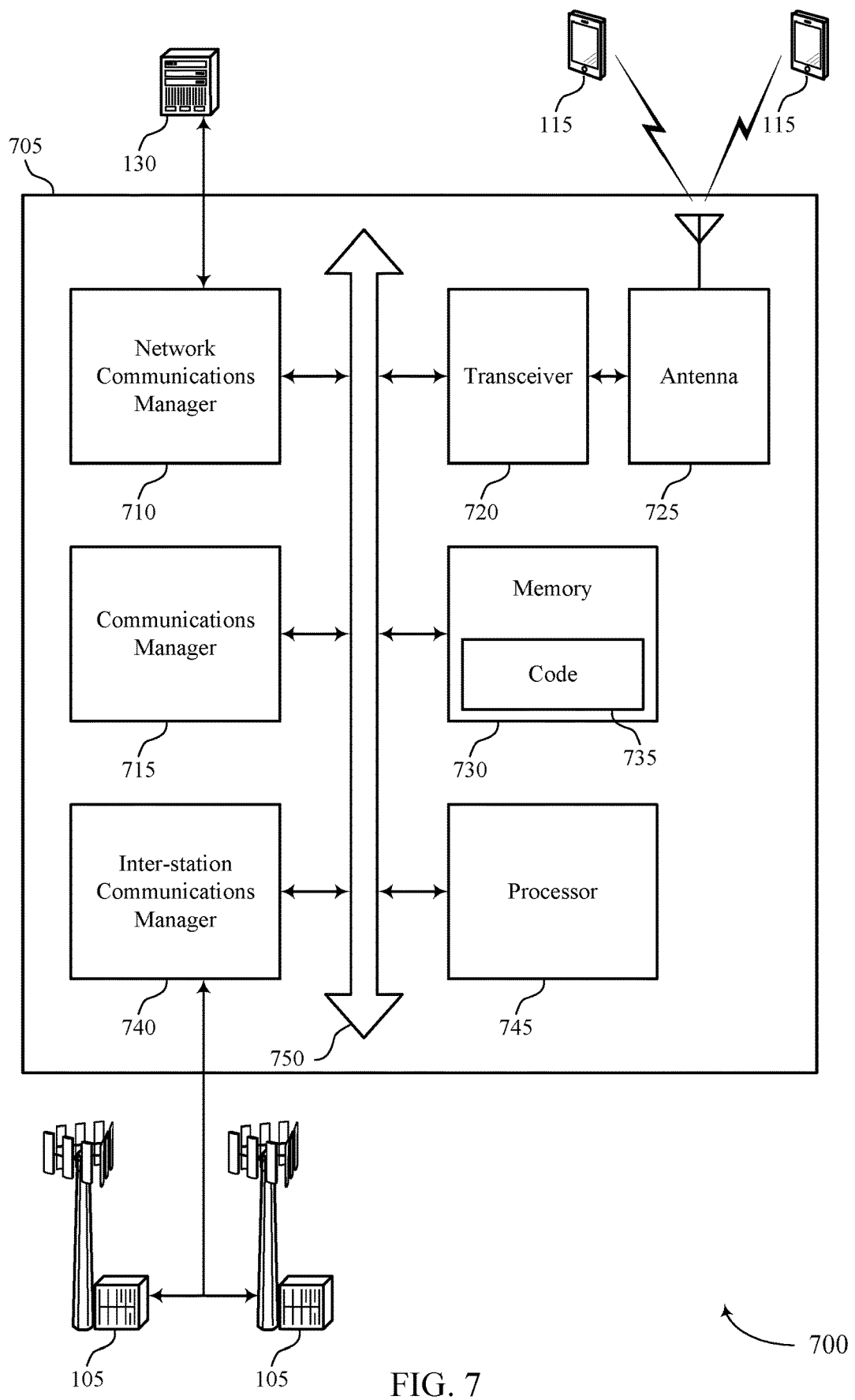
FIG. 7 shows a diagram of a system including a device that supports scheduling request polling for sidelink communications in accordance with aspects of the present disclosure.

FIG. 7 shows a diagram of a system 700 including a device 705 that supports scheduling request polling for sidelink communications in accordance with aspects of the present disclosure. The device 705 may be an example of or include the components of device 405, device 505, or a UE 115 as described herein. The device 705 may communicate wireless with one or more base stations 105, UEs 115, or any combination thereof. The device 705 may include components for bi-directional voice and data communications including components for transmitting and receiving communications, including a network communications manager 710, a communication manager 715, a transceiver 720, an antenna 725, a memory 730, an inter-station communications manager 740, and a processor 745. These components may be in electronic communication via one or more buses (e.g., bus 750).

The network communications manager 710 may manage communications with the core network 130 (via on or more wired backhaul links). For example, the network communications manager 710 may manage the transfer of data communications for client devices, such as one or more UEs 115.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 745 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 745 may be configured to operate a memory array using a memory controller. In other cases, a memory controller may be integrated into the processor 745. The processor 745 may be configured to execute computer-readable instructions stored in a memory (e.g., the memory 730) to cause the device 705 to perform various functions (e.g., functions or tasks supporting scheduling request polling for sidelink communications).

The inter-station communications manager 740 may manage communications with other base station 105, and may include a controller or scheduler for controlling communications with UEs 115 in cooperation with other base stations 105. For example, the inter-station communications manager 740 may coordinate scheduling for transmissions to UEs 115 for various interference mitigation techniques such as beamforming or joint transmission. In some examples, the inter-station communications manager 740 may provide an X2 interface within an LTE/LTE-A wireless communication network technology to provide communication between base stations 105.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 745 but may cause a computer (e.g., when compiled and executed) to perform functions described herein.

The communication manager 715 may support wireless communication at a first wireless device (e.g., a PLC) in accordance with examples as disclosed herein. The communication manager 715 may be configured to support receiving an indication of sidelink communication resources that are reserved for sidelink transmissions. The communication manager 715 may be configured to support transmitting a polling request in control information that is associated with a data transmission from the first wireless device using the sidelink communication resources. The communication manager 715 may be configured to support receiving, from a second wireless device in response to the polling request, feedback including an indication of an availability of data for transmission to the first wireless device.

The communication manager 715 may support wireless communication at a first wireless device (e.g., an S/A) in accordance with examples as disclosed herein. The communication manager 715 may be configured to support receiving a polling request in control information that is associated with a data transmission from the first wireless device using sidelink communication resources that are reserved for sidelink transmissions. The communication manager 715 may be configured to support transmitting, to a second wireless device in response to the polling request, feedback including an indication of an availability of data for transmission to the second wireless device.

The communication manager 715 may be an example of a communication manager 415, communication manager 515, or communication manager 615, as described with reference to FIGS. 4 through 6. In some examples, the code 735 may include instructions executable by the processor 745 to cause the device 705 to perform various aspects of scheduling request polling for sidelink communications as described herein, or the processor 745 and the memory 730 may be otherwise configured to perform such operations.

Figure 8:
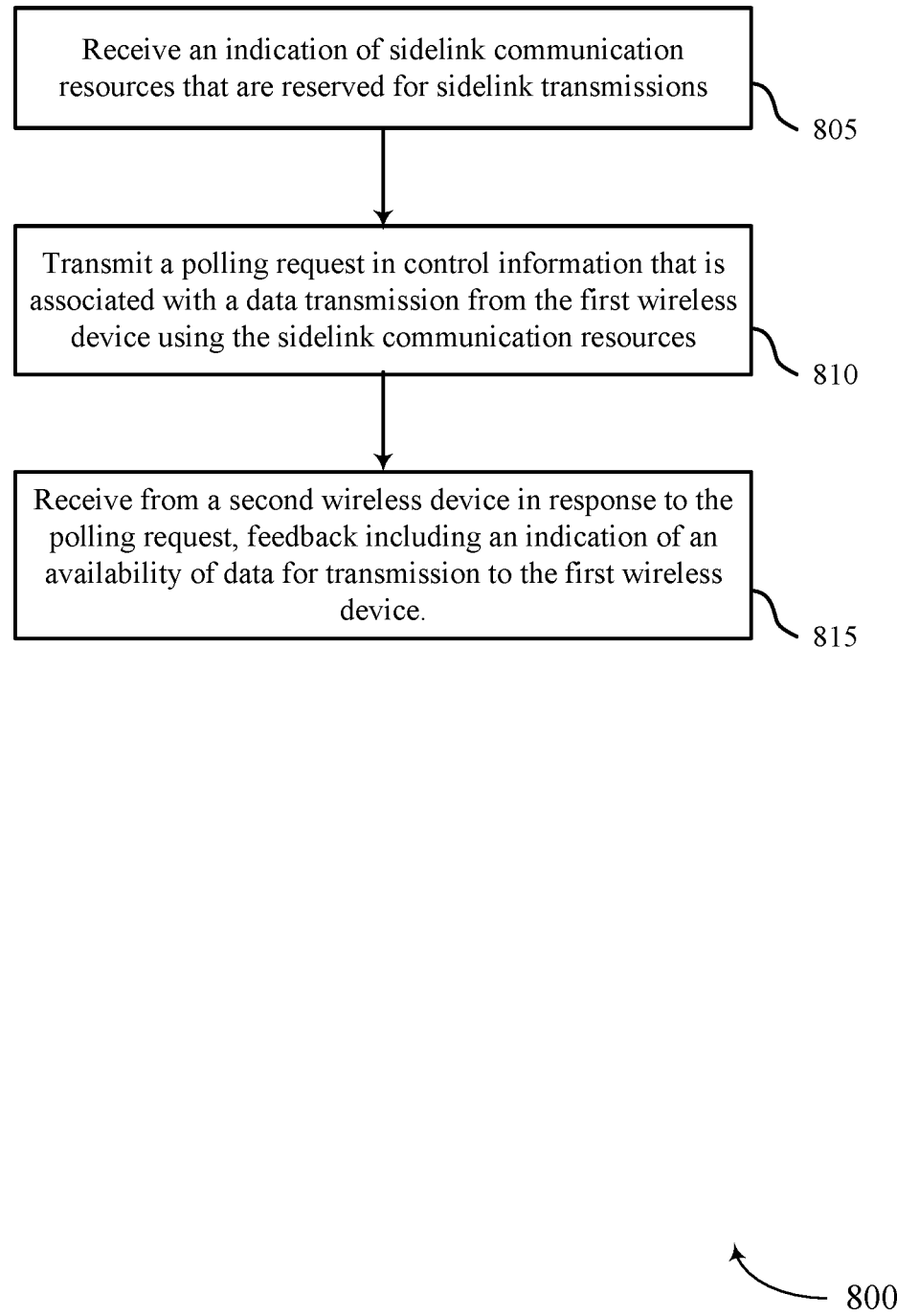
FIGS. 8 through 11 show flowcharts illustrating methods that support scheduling request polling for sidelink communications in accordance with aspects of the present disclosure.

FIG. 8 shows a flowchart illustrating a method 800 for scheduling request polling for sidelink communications in accordance with aspects of the present disclosure. The operations of method 800 may be implemented by a UE or its components as described herein. For example, the operations of method 800 may be performed by a UE 115 as described with reference to FIGS. 4 through 7. In some examples, a UE may execute a set of instructions to control the functional elements of the device to perform the described functions. Additionally, or alternatively, the UE may perform aspects of the described functions using special-purpose hardware.

At 805, the method may include receiving an indication of sidelink communication resources that are reserved for sidelink transmissions. The operations of 805 may be performed according to the methods described herein. In some examples, aspects of the operations of 805 may be performed by a sidelink resources component as described herein.

At 810, the method may include transmitting a polling request in control information that is associated with a data transmission from the first wireless device using the sidelink communication resources. The operations of 810 may be performed according to the methods described herein. In some examples, aspects of the operations of 810 may be performed by a sidelink polling component as described herein.

At 815, the method may include receiving, from a second wireless device in response to the polling request, feedback comprising an indication of an availability of data for transmission to the first wireless device. The operations of 815 may be performed according to the methods described herein. In some examples, aspects of the operations of 815 may be performed by a sidelink feedback component as described herein.

Figure 9:
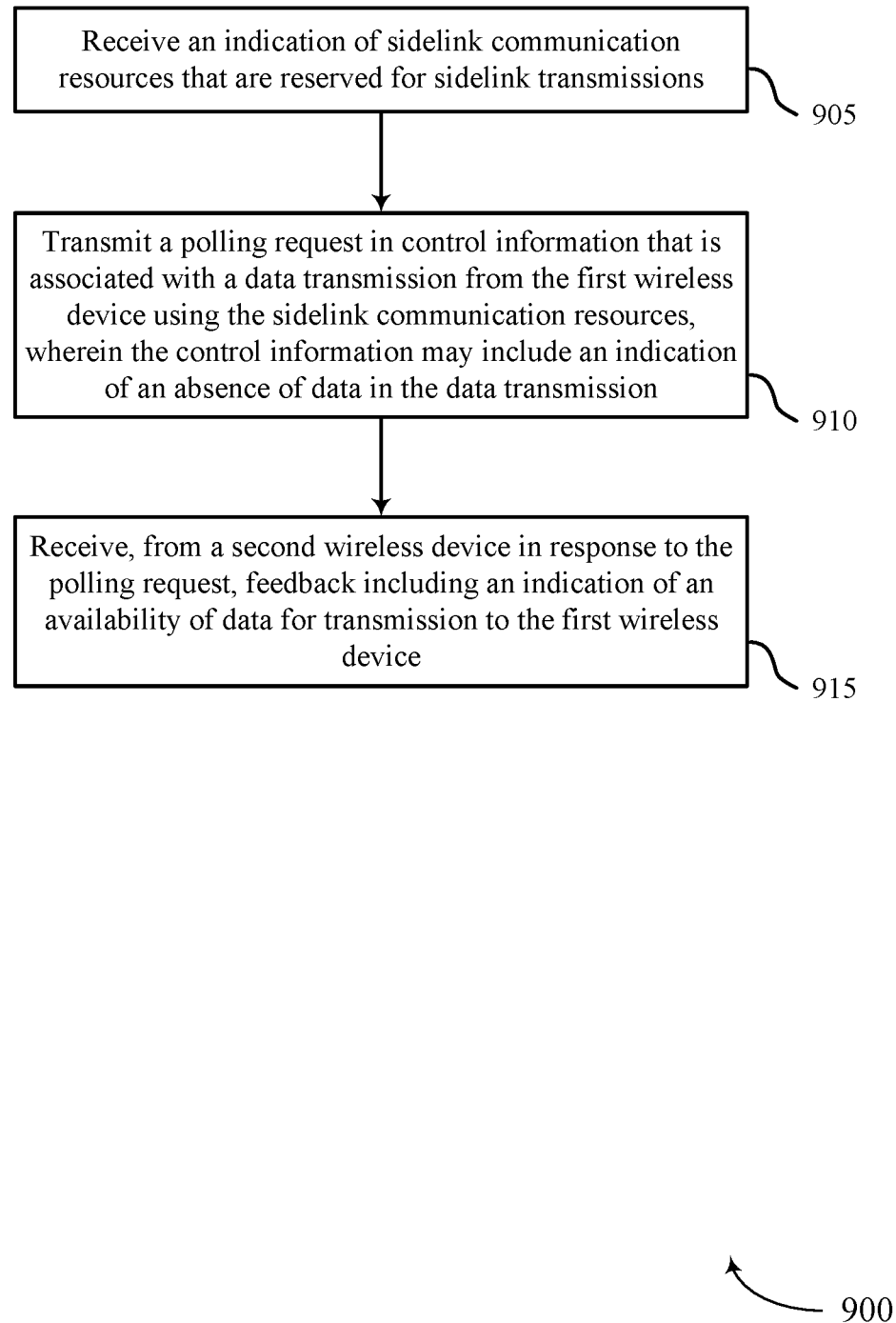

FIG. 9 shows a flowchart illustrating a method 900 for scheduling request polling for sidelink communications in accordance with aspects of the present disclosure. The operations of method 900 may be implemented by a UE or its components as described herein. For example, the operations of method 900 may be performed by a UE 115 as described with reference to FIGS. 4 through 7. In some examples, a UE may execute a set of instructions to control the functional elements of the device to perform the described functions. Additionally, or alternatively, the UE may perform aspects of the described functions using special-purpose hardware.

At 905, the method may include receiving an indication of sidelink communication resources that are reserved for sidelink transmissions. The operations of 905 may be performed according to the methods described herein. In some examples, aspects of the operations of 905 may be performed by a sidelink resources component as described herein.

At 910, the method may include transmitting a polling request in control information that is associated with a data transmission from the first wireless device using the sidelink communication resources. The control information may also include an indication of an absence of data in the data transmission. The operations of 910 may be performed according to the methods described herein. In some examples, aspects of the operations of 910 may be performed by a sidelink polling component and/or sidelink control component as described herein.

At 915, the method may include receiving, from a second wireless device in response to the polling request, feedback comprising an indication of an availability of data for transmission to the first wireless device. The operations of 915 may be performed according to the methods described herein. In some examples, aspects of the operations of 915 may be performed by a sidelink feedback component as described herein.

Figure 10:
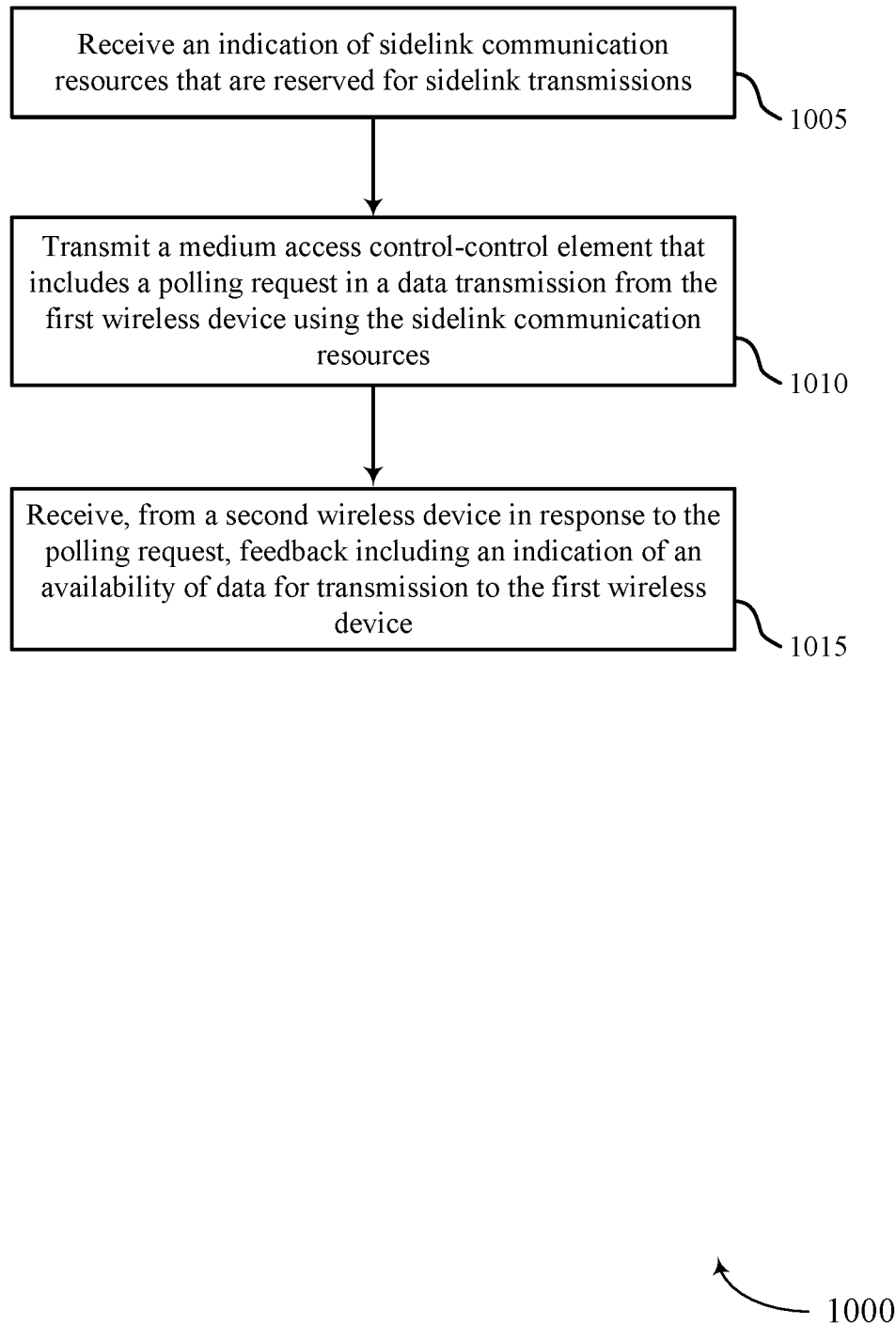

FIG. 10 shows a flowchart illustrating a method 1000 for scheduling request polling for sidelink communications in accordance with aspects of the present disclosure. The operations of method 1000 may be implemented by a UE or its components as described herein. For example, the operations of method 1000 may be performed by a UE 115 as described with reference to FIGS. 4 through 7. In some examples, a UE may execute a set of instructions to control the functional elements of the device to perform the described functions. Additionally, or alternatively, the UE may perform aspects of the described functions using special-purpose hardware.

At 1005, the method may include receiving an indication of sidelink communication resources that are reserved for sidelink transmissions. The operations of 1005 may be performed according to the methods described herein. In some examples, aspects of the operations of 1005 may be performed by a sidelink resources component as described herein.

At 1010, the method may include transmitting a medium access control-control element that includes a polling request in a data transmission from the first wireless device using the sidelink communication resources. The operations of 1010 may be performed according to the methods described herein. In some examples, aspects of the operations of 1010 may be performed by a sidelink polling component and/or sidelink control component as described herein.

At 1015, the method may include receiving, from a second wireless device in response to the polling request, feedback including an indication of an availability of data for transmission to the first wireless device. The operations of 1015 may be performed according to the methods described herein. In some examples, aspects of the operations of 1015 may be performed by a sidelink feedback component as described herein.

Figure 11:
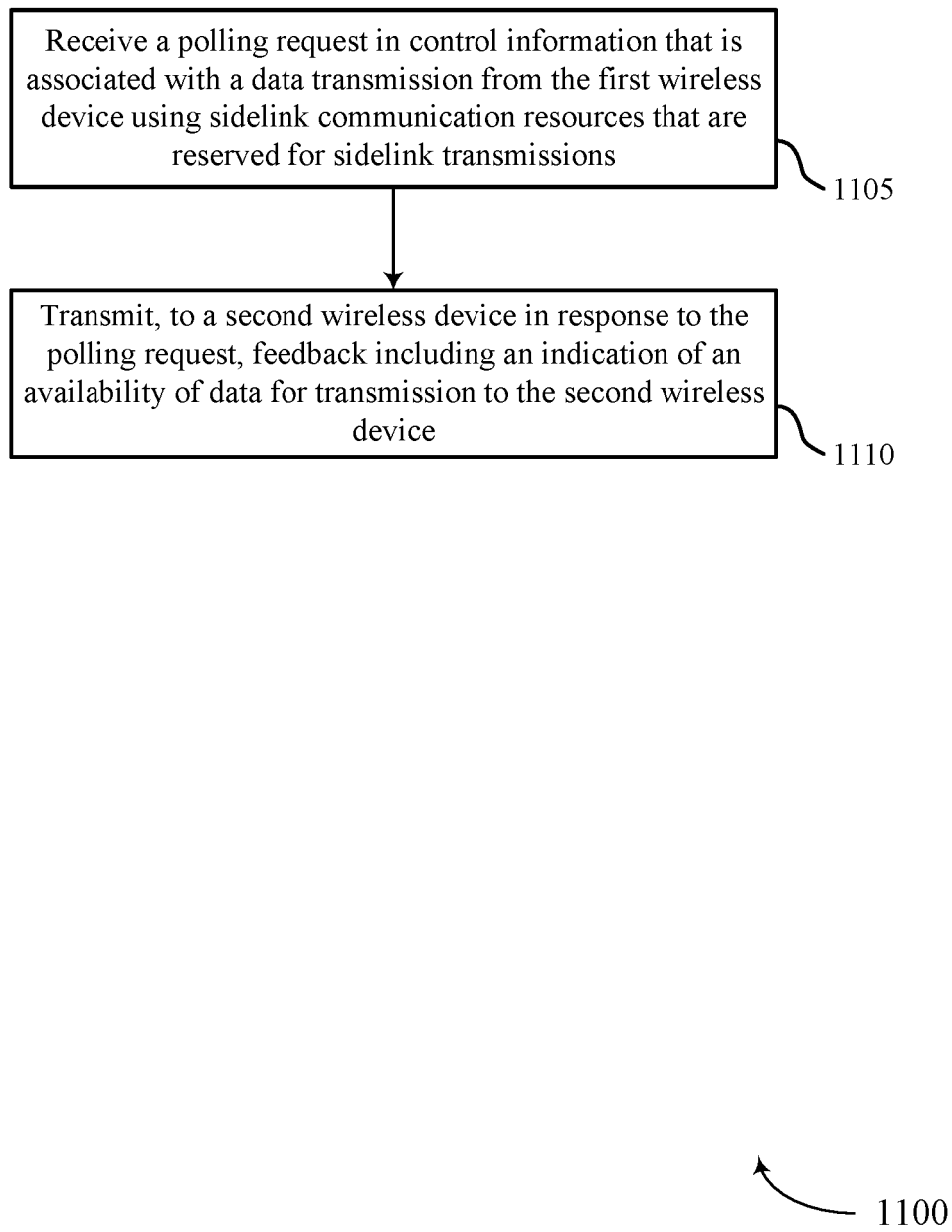

FIG. 11 shows a flowchart illustrating a method 1100 for scheduling request polling for sidelink communications in accordance with aspects of the present disclosure. The operations of method 1100 may be implemented by a UE or its components as described herein. For example, the operations of method 1100 may be performed by a UE 115 as described with reference to FIGS. 4 through 7. In some examples, a UE may execute a set of instructions to control the functional elements of the device to perform the described functions. Additionally, or alternatively, the UE may perform aspects of the described functions using special-purpose hardware.

At 1105, the method may include receiving a polling request in control information that is associated with a data transmission from the first wireless device using sidelink communication resources that are reserved for sidelink transmissions. The operations of 1105 may be performed according to the methods described herein. In some examples, aspects of the operations of 1105 may be performed by a sidelink polling component as described herein.

At 1110, the method may include transmitting, to a second wireless device in response to the polling request, feedback comprising an indication of an availability of data for transmission to the second wireless device. The operations of 1110 may be performed according to the methods described herein. In some examples, aspects of the operations of 1110 may be performed by a sidelink feedback component as described herein.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
receiving a polling request, from a second wireless device, in first sidelink control information or second sidelink control information, wherein the first sidelink control information uses sidelink control channel resources in accordance with a first sidelink control information format and the first sidelink control information is used to schedule the second sidelink control information and a data transmission over sidelink data channel resources; and
transmitting, to the second wireless device in response to the polling request, feedback comprising an indication of an availability of data for transmission to the second wireless device.

2. The method of claim 1, wherein a field in the first sidelink control information that is configured to indicate a second sidelink control information format for the second sidelink control information comprises the polling request.

3. The method of claim 1, wherein:
a first field in the second sidelink control information used to request channel state information from the first wireless device comprises the polling request; or a second field in the second sidelink control information used to indicate polling requests comprises the polling request.

4. The method of claim 1, wherein receiving the polling request further comprises:
receiving the polling request in the second sidelink control information that is transmitted during an occurrence of the sidelink data channel resources in accordance with the first sidelink control information format and is used to indicate characteristics of the data transmission.

5. The method of claim 4, wherein a field in the first sidelink control information is used to indicate that the polling request is for a group of wireless devices of a plurality of groups of wireless devices.

6. The method of claim 5, further comprising:
receiving, from the second wireless device, an indication that the first wireless device is included in the group of wireless devices.

7. The method of claim 1, wherein the polling request is for a group of wireless devices and is transmitted during a time interval, the method further comprising:
receiving a configuration that configures the first wireless device to monitor for polling requests during a set of time intervals that includes the time interval.

8. The method of claim 1, wherein transmitting the feedback comprises:
transmitting, to the second wireless device, a scheduling request using sidelink feedback channel resources.

9. The method of claim 8, further comprising:
transmitting a medium access control-control element comprising a buffer status report indicating an amount of data available for transmission from the first wireless device based at least in part on receiving the scheduling request.

10. The method of claim 1, wherein transmitting the feedback comprises:
transmitting, to the second wireless device, an indication of an amount of data available for transmission from the first wireless device using sidelink feedback channel resources.

11. The method of claim 1, wherein transmitting the feedback comprises:
transmitting the feedback for the polling request using sidelink feedback channel resources.

12. The method of claim 11, further comprising:
transmitting second feedback for a data message included in the data transmission using the sidelink feedback channel resources, the second feedback being multiplexed with the feedback.

13. The method of claim 11, further comprising:
transmitting second feedback for a data message included in the data transmission using second sidelink feedback channel resources that are non-overlapping with the sidelink feedback channel resources.

14. The method of claim 1, further comprising:
receiving, in the first sidelink control information or the second sidelink control information, an indication of an absence of data in the data transmission.

15. The method of claim 14, wherein one or more fields in the first sidelink control information or the second sidelink control information are used to indicate the absence of data in the data transmission.

16. The method of claim 1, wherein receiving the polling request further comprises:
receiving a medium access control-control element that comprises the polling request in a header of the data transmission, the first sidelink control information or the second sidelink control information being medium access control layer control information.

17. The method of claim 16, wherein transmitting the feedback comprises:
transmitting, in response to the polling request, a buffer status report using sidelink feedback channel resources.

18. The method of claim 17, further comprising:
transmitting second feedback for a data message included in the data transmission, wherein the second feedback is received using the sidelink feedback channel resources, the second feedback being multiplexed with the feedback.

19. The method of claim 17, further comprising:
transmitting second feedback for a data message included in the data transmission, wherein the second feedback is received using second sidelink feedback channel resources that are non-overlapping with the sidelink feedback channel resources.

20. A method for wireless communication at a first wireless device, comprising:
receiving an indication of sidelink communication resources that are reserved for sidelink transmissions;
transmitting, to a second wireless device, a polling request in first sidelink control information or second sidelink control information, wherein the first sidelink control information uses sidelink control channel resources in accordance with a first sidelink control information format and the first sidelink control information is used to schedule the second sidelink control information and a data transmission over sidelink data channel resources; and receiving, from the second wireless device in response to the polling request, feedback comprising an indication of an availability of data for transmission to the first wireless device.

21. The method of claim 20, wherein the polling request is for a group of wireless devices and is transmitted during a time interval, the method further comprising:

transmitting, to the group of wireless devices, a configuration that configures the group of wireless devices to monitor for polling requests during a set of time intervals that includes the time interval.

22. The method of claim 20, wherein receiving the feedback comprises:

receiving, from the second wireless device, a scheduling request using sidelink feedback channel resources of the sidelink communication resources, the method further comprising:

determining that the second wireless device has data to transmit to the first wireless device based at least in part on the scheduling request.

23. The method of claim 22, further comprising:

receiving a medium access control-control element comprising a buffer status report indicating an amount of data available for transmission from the second wireless device based at least in part on receiving the scheduling request; and determining the amount of data available for transmission from the second wireless device based at least in part on the buffer status report.

24. The method of claim 20, further comprising:

determining that an amount of data available to be transmitted from the second wireless device is below a threshold based at least in part on the feedback; and refraining from scheduling reverse sidelink resources for the second wireless device based at least in part on the amount of data being below the threshold.

25. An apparatus for wireless communication at a first wireless device, comprising:

a processor, memory coupled with the processor; and instructions stored in the memory and executable by the processor to cause the apparatus to:

receive an indication of sidelink communication resources that are reserved for sidelink transmissions;

transmit, to a second wireless device, a polling request in first sidelink control information or second sidelink control information, wherein the first sidelink control information uses sidelink control channel resources in accordance with a first sidelink control information format and the first sidelink control information is used to schedule the second sidelink control information and a data transmission over sidelink data channel resources; and receive, from the second wireless device in response to the polling request, feedback comprising an indication of an availability of data for transmission to the first wireless device.

26. An apparatus for wireless communication at a first wireless device, comprising:

a processor, memory coupled with the processor; and instructions stored in the memory and executable by the processor to cause the apparatus to:

receive a polling request, from a second wireless device, in first sidelink control information or second sidelink control information, wherein the first sidelink control information uses sidelink control channel resources in accordance with a first sidelink control information format and the first sidelink control information is used to schedule the second sidelink control information and a data transmission over sidelink data channel resources; and transmit, to the second wireless device in response to the polling request, feedback comprising an indication of an availability of data for transmission to the second wireless device.

* * * * *